(12) United States Patent
Costakis et al.

(10) Patent No.: US 11,867,426 B2
(45) Date of Patent: Jan. 9, 2024

(54) SYSTEM AND METHODS UTILIZING FLUID COOLERS AND CHILLERS TO PERFORM IN-SERIES HEAT REJECTION AND TRIM COOLING

(71) Applicant: Inertech IP LLC, Plano, TX (US)

(72) Inventors: John Costakis, Glasco, NY (US); Ming Zhang, Weston, CT (US); Earl Keisling, Ridgefield, CT (US); Ken Nguyen, Danbury, CT (US)

(73) Assignee: INERTECH IP LLC, Plano, TX (US)

( * ) Notice: Subject to any disclaimer, the term of this patent is extended or adjusted under 35 U.S.C. 154(b) by 0 days.

(21) Appl. No.: 17/887,192

(22) Filed: Aug. 12, 2022

(65) Prior Publication Data
US 2023/0108538 A1    Apr. 6, 2023

Related U.S. Application Data

(63) Continuation of application No. 16/695,007, filed on Nov. 25, 2019, now Pat. No. 11,415,330, which is a
(Continued)

(51) Int. Cl.
F24F 5/00    (2006.01)
F24F 11/83    (2018.01)
(Continued)

(52) U.S. Cl.
CPC ............ *F24F 5/0007* (2013.01); *F24F 5/001* (2013.01); *F24F 5/0003* (2013.01);
(Continued)

(58) Field of Classification Search
CPC .......... F24F 11/46; F24F 11/83; F24F 5/0003; F24F 5/0007; F24F 5/001; F24F 5/0035;
(Continued)

(56) References Cited

U.S. PATENT DOCUMENTS 3,913,345 A    10/1975  Goettl
4,067,205 A    1/1978   Mayhue
(Continued)

FOREIGN PATENT DOCUMENTS

DE    202004003309 U    8/2004
DE    202004003310 U    8/2004
(Continued)

OTHER PUBLICATIONS

"Aquaflair Adiabatic Packaged Air Cooled Chillers", Schneider Electric, 2015, 6 pages.
(Continued)

*Primary Examiner* — Henry T Crenshaw
(74) *Attorney, Agent, or Firm* — Weber Rosselli & Cannon LLP

(57) ABSTRACT

The cooling systems and methods of the present disclosure involve modular fluid coolers and chillers configured for optimal power and water use based on environmental conditions and client requirements. The fluid coolers include wet media, a first fluid circuit for distributing fluid across wet media, an air to fluid heat exchanger, and an air to refrigerant heat exchanger. The chillers, which are fluidly coupled to the fluid coolers via pipe cages, include a second fluid circuit in fluid communication with the air to fluid heat exchanger and a refrigerant circuit in thermal communication with the second fluid circuit and in fluid communication with the air to refrigerant heat exchanger. Pipe cages are coupled together to allow for expansion of the cooling system when additional cooling capacity is needed. The fluid coolers and chillers are configured to selectively operate in wet or dry free cooling mode, partial free cooling mode, or mechanical cooling mode.

4 Claims, 26 Drawing Sheets

Related U.S. Application Data continuation of application No. 15/398,512, filed on Jan. 4, 2017, now Pat. No. 10,488,061, which is a continuation of application No. PCT/US2016/057912, filed on Oct. 20, 2016.

(60) Provisional application No. 62/308,914, filed on Mar. 16, 2016.

(51) Int. Cl.

| | | |
|---|---|---|
| *F25B 25/00* | (2006.01) | |
| *F25B 23/00* | (2006.01) | |
| *F24F 11/84* | (2018.01) | |
| *F24F 11/85* | (2018.01) | |
| *F24F 110/12* | (2018.01) | |
| *F24F 140/50* | (2018.01) | |
| *F24F 11/46* | (2018.01) | |
| *F24F 13/22* | (2006.01) | |
| *F28C 1/00* | (2006.01) | |

(52) U.S. Cl.
CPC ............ *F24F 5/0035* (2013.01); *F24F 11/83* (2018.01); *F24F 11/84* (2018.01); *F24F 11/85* (2018.01); *F25B 23/006* (2013.01); *F25B 25/00* (2013.01); *F25B 25/005* (2013.01); *F24F 11/46* (2018.01); *F24F 2013/225* (2013.01); *F24F 2110/12* (2018.01); *F24F 2140/50* (2018.01); *F25B 2339/041* (2013.01); *F25B 2339/047* (2013.01); *F25B 2700/197* (2013.01); *F25B 2700/21163* (2013.01); *F28C 2001/006* (2013.01); *Y02B 30/54* (2013.01)

(58) Field of Classification Search
CPC ...... F25B 23/006; F25B 25/00; F25B 25/005; Y02B 30/54
See application file for complete search history.

(56) References Cited

U.S. PATENT DOCUMENTS

| | | | |
|---|---|---|---|
| 4,406,138 A | 9/1983 | Nelson | |
| 4,535,386 A | 8/1985 | Frey, Jr. et al. | |
| 5,222,370 A | 6/1993 | James | |
| 5,467,250 A | 11/1995 | Howard et al. | |
| 5,475,986 A | 12/1995 | Bahel et al. | |
| 5,797,275 A | 8/1998 | Forsman | |
| 6,023,935 A | 2/2000 | Okazaki et al. | |
| 6,034,873 A | 3/2000 | Staahl et al. | |
| 6,142,219 A | 11/2000 | Korenic et al. | |
| 6,164,369 A | 12/2000 | Stoller | |
| 6,257,007 B1 | 7/2001 | Hartman | |
| 6,305,180 B1 | 10/2001 | Miller et al. | |
| 6,453,993 B1 | 9/2002 | Bujak, Jr. | |
| 6,640,561 B2 | 11/2003 | Trecate et al. | |
| 6,714,412 B1 | 3/2004 | Chu et al. | |
| 6,718,779 B1 | 4/2004 | Henry | |
| 6,819,563 B1 | 11/2004 | Chu et al. | |
| 6,832,489 B2 | 12/2004 | Bash et al. | |
| 6,854,287 B2 | 2/2005 | Patel et al. | |
| 6,924,981 B2 | 8/2005 | Chu et al. | |
| 6,927,980 B2 | 8/2005 | Fukuda et al. | |
| 6,973,801 B1 | 12/2005 | Campbell et al. | |
| 7,036,330 B2 | 5/2006 | Grabon et al. | |
| 7,106,590 B2 | 9/2006 | Chu et al. | |
| 7,159,518 B2 | 1/2007 | Haas et al. | |
| 7,184,267 B2 | 2/2007 | Patel | |
| 7,255,640 B2 | 8/2007 | Aldag et al. | |
| 7,278,273 B1 | 10/2007 | Whitted et al. | |
| 7,312,993 B2 | 12/2007 | Bundza et al. | |
| 7,318,322 B2 | 1/2008 | Ota et al. | |
| 7,342,789 B2 | 3/2008 | Hall et al. | |
| 7,397,661 B2 | 7/2008 | Campbell et al. | |
| 7,430,118 B1 | 9/2008 | Noteboom et al. |
| 7,511,959 B2 | 3/2009 | Belady et al. |
| 7,599,184 B2 | 10/2009 | Upadhya et al. |
| 7,660,116 B2 | 2/2010 | Claassen et al. |
| 7,679,909 B2 | 3/2010 | Spearing et al. |
| 7,724,516 B2 | 5/2010 | Harder et al. |
| 7,724,518 B1 | 5/2010 | Carlson et al. |
| 7,746,634 B2 | 6/2010 | Hom et al. |
| 7,746,637 B2 | 6/2010 | Brian et al. |
| 7,800,900 B1 | 9/2010 | Noteboom et al. |
| 7,836,597 B2 | 11/2010 | Datta et al. |
| 7,856,838 B2 | 12/2010 | Daniel et al. |
| 7,864,527 B1 | 1/2011 | Whitted |
| 7,872,865 B2 | 1/2011 | Matsushima et al. |
| 7,905,106 B2 | 3/2011 | Attlesey |
| 7,957,142 B2 | 6/2011 | Noteboom et al. |
| 7,961,463 B2 | 6/2011 | Belady et al. |
| 8,004,839 B2 | 8/2011 | Sato et al. |
| 8,006,496 B2 | 8/2011 | Carter |
| 8,031,468 B2 | 10/2011 | Bean, Jr. et al. |
| 8,077,457 B2 | 12/2011 | Gauthier et al. |
| 8,113,010 B2 | 2/2012 | Carlson |
| 8,120,916 B2 | 2/2012 | Schmidt et al. |
| 8,141,374 B2 | 3/2012 | Hay |
| 8,261,561 B2 | 9/2012 | Rigal et al. |
| 8,261,565 B2 | 9/2012 | Borror et al. |
| 8,320,125 B1 | 11/2012 | Hamburgen et al. |
| 8,520,387 B2 | 8/2013 | Chen et al. |
| 8,578,726 B2 | 11/2013 | Hay |
| 8,584,477 B2 | 11/2013 | Hay |
| 9,119,326 B2 | 8/2015 | Mcdonnell et al. |
| 9,179,580 B2 | 11/2015 | Tozer |
| 9,243,822 B2 | 1/2016 | Borror et al. |
| 9,243,823 B2 | 1/2016 | Borror et al. |
| 2003/0000230 A1 | 1/2003 | Kopko |
| 2003/0188543 A1 | 10/2003 | Trecate et al. |
| 2004/0000155 A1 | 1/2004 | Cline et al. |
| 2004/0100770 A1 | 5/2004 | Chu et al. |
| 2004/0118136 A1 | 6/2004 | Patel et al. |
| 2004/0190270 A1 | 9/2004 | Aldag et al. |
| 2004/0221604 A1 | 11/2004 | Ota et al. |
| 2004/0226686 A1 | 11/2004 | Maeda |
| 2004/0237554 A1 | 12/2004 | Stark et al. |
| 2005/0235671 A1 | 10/2005 | Belady et al. |
| 2006/0000596 A1 | 1/2006 | Kranz et al. |
| 2006/0065000 A1 | 3/2006 | Belady |
| 2006/0199051 A1 | 9/2006 | Bai et al. |
| 2006/0232945 A1 | 10/2006 | Chu et al. |
| 2007/0019391 A1 | 1/2007 | Xu et al. |
| 2007/0167125 A1 | 7/2007 | Rasmussen et al. |
| 2007/0227710 A1 | 10/2007 | Belady et al. |
| 2007/0283710 A1 | 12/2007 | Gilbert et al. |
| 2008/0018212 A1 | 1/2008 | Spearing et al. |
| 2008/0024997 A1 | 1/2008 | Ghantiwala |
| 2008/0055846 A1 | 3/2008 | Clidaras et al. |
| 2008/0055848 A1 | 3/2008 | Hamburgen et al. |
| 2008/0094797 A1 | 4/2008 | Coglitore et al. |
| 2008/0123288 A1 | 5/2008 | Daniel |
| 2008/0158815 A1 | 7/2008 | Campbell et al. |
| 2008/0174393 A1 | 7/2008 | Schnetzka et al. |
| 2008/0174961 A1 | 7/2008 | Campbell et al. |
| 2008/0204999 A1 | 8/2008 | Clidaras et al. |
| 2008/0233069 A1 | 9/2008 | Tamareselvy et al. |
| 2008/0273306 A1 | 11/2008 | Campbell et al. |
| 2008/0285228 A1 | 11/2008 | Koch et al. |
| 2008/0291626 A1 | 11/2008 | Nelson et al. |
| 2009/0122487 A1 | 5/2009 | Campbell et al. |
| 2009/0133866 A1 | 5/2009 | Campbell et al. |
| 2009/0171512 A1 | 7/2009 | Duncan |
| 2009/0207880 A1 | 8/2009 | Ahladas et al. |
| 2009/0210096 A1 | 8/2009 | Stack et al. |
| 2009/0216910 A1 | 8/2009 | Duchesneau |
| 2009/0241578 A1 | 10/2009 | Carlson et al. |
| 2010/0076607 A1 | 3/2010 | Ahmed et al. |
| 2010/0077788 A1 | 4/2010 | Lewis |
| 2010/0091448 A1 | 4/2010 | Noteboom et al. |
| 2010/0136895 A1 | 6/2010 | Sgro |
| 2010/0144265 A1 | 6/2010 | Bednarcik et al. |
| 2010/0162737 A1 | 7/2010 | Hall et al. |

(56) References Cited

U.S. PATENT DOCUMENTS

| | | | |
|---|---|---|---|
| 2010/0188816 | A1 | 7/2010 | Bean, Jr. et al. |
| 2010/0263830 | A1 | 10/2010 | Noteboom et al. |
| 2010/0297927 | A1 | 11/2010 | Nagamatsu et al. |
| 2010/0307171 | A1 | 12/2010 | Hamann et al. |
| 2011/0100045 | A1 | 5/2011 | Carlson |
| 2011/0154842 | A1 | 6/2011 | Heydari et al. |
| 2011/0265983 | A1 | 11/2011 | Pedersen |
| 2011/0271695 | A1 | 11/2011 | Kashirajima et al. |
| 2011/0299242 | A1 | 12/2011 | Grantham et al. |
| 2012/0010754 | A1 | 1/2012 | Matteson |
| 2012/0012283 | A1 | 1/2012 | Bean, Jr. et al. |
| 2012/0103591 | A1* | 5/2012 | Tozer ............... H05K 7/20836 165/96 |
| 2012/0125023 | A1* | 5/2012 | Kopko ............... F25B 25/005 62/113 |
| 2012/0134108 | A1 | 5/2012 | Brouillard |
| 2012/0167670 | A1 | 7/2012 | Bean, Jr. et al. |
| 2013/0077238 | A1 | 3/2013 | Babish et al. |
| 2013/0233532 | A1 | 9/2013 | Imwalle et al. |
| 2014/0033753 | A1 | 2/2014 | Lu et al. |
| 2014/0096547 | A1 | 4/2014 | Boehde et al. |
| 2014/0216068 | A1 | 8/2014 | Lee et al. |
| 2014/0278245 | A1 | 9/2014 | Voigt et al. |
| 2015/0102114 | A1 | 4/2015 | Mcfarland et al. |
| 2015/0204626 | A1 | 7/2015 | Martell et al. |
| 2015/0241073 | A1 | 8/2015 | Furlan et al. |
| 2016/0076831 | A1* | 3/2016 | Marchetti ......... H05K 7/20745 165/300 |
| 2016/0178224 | A1 | 6/2016 | Venturelli et al. |
| 2017/0067396 | A1 | 3/2017 | Kustura et al. |
| 2017/0198933 | A1 | 7/2017 | Erpelding et al. |

FOREIGN PATENT DOCUMENTS

| | | | |
|---|---|---|---|
| DE | 102012218873 | A1 | 5/2013 |
| EP | 0961092 | A1 | 12/1999 |
| EP | 1855070 | A2 | 11/2007 |
| GB | 845844 | A | 8/1960 |
| GB | 2444981 | A | 6/2008 |
| GB | 2480470 | A | 11/2011 |
| JP | H0611210 | A | 1/1994 |
| JP | 2003028539 | A | 1/2003 |
| JP | 2003294338 | A | 10/2003 |
| JP | 2005009808 | A | 1/2005 |
| JP | 2007087498 | A | 4/2007 |
| JP | 2008530509 | A | 8/2008 |
| JP | 2008287733 | A | 11/2008 |
| JP | 2009123212 | A | 6/2009 |
| JP | 2009216295 | A | 9/2009 |
| JP | 2011227829 | A | 11/2011 |
| JP | 2013119990 | A | 6/2013 |
| JP | 5308750 | B2 | 10/2013 |
| KR | 20050084871 | A | 8/2005 |
| KR | 101341790 | B1 | 12/2013 |
| WO | 9963797 | A1 | 12/1999 |
| WO | 03006908 | A1 | 1/2003 |
| WO | 2007102978 | A1 | 9/2007 |
| WO | 2009114103 | A1 | 9/2009 |
| WO | 2009156647 | A1 | 12/2009 |
| WO | 2010087915 | A1 | 8/2010 |
| WO | 2010141205 | A2 | 12/2010 |
| WO | 2010144677 | A1 | 12/2010 |
| WO | 2014207434 | A1 | 12/2014 |

OTHER PUBLICATIONS

"Earthsmart Adiabatic Towers", Conair, Technical Data Sheets, 4 pages.
"Freecooling system", Meta Industrial, www.metaind.com/page/free-cooling, retrieved Mar. 31, 2016, 3 pages.
"GHA ES Range Air cooled chiller with screw compressors, axial fans and Evaporative System for outdoor installation"; Geoclima Smart HVAC Solutions, Technical Data Sheet, 16 pages.
"Hydra II Series Fluid Coolers", Southgate Process Equipement, Inc., Technical Data Sheets, 4 pages.
"Klima-Therm tubomiser adiabatic free cooling chiller", Klima-Therm Limited, Technical Data Sheet, 4 pages.
"Liebert AFC—The Adiabatic Freecooling Solution with Top-Tier Availability", Emerson Network Power, Technical Data Sheet, 16 pages.
"TMA ES Range Air cooled chiller with centrifugal compressors, axial fans and Evaporative System for outdoor installation", Geoclima Turbomiser Range, Geoclima Smart HVAC solutions, Technical Data Sheet, 20 pages.
"Trillium Series Fluid Cooler", Baltimore Air Coil, Technical Data Sheets, Mar. 2012, 8 pages.
Adia-Denco/DencoHappel "Adiabatic Data Center Cooling", www.dencohappel.com/products/air-treatment-systems/close-control/adia-denco, retrieved Mar. 31, 2016, 4 pages.
Airedale aire flow adiabatic freecooling chiller, Airedale International Air Conditioning Limited, www.airedale.com, 12 pages.
Booth, "Emerson Launches First Adiabatic Freecooling Chiller", Datacenter Dynamics, Press Release May 5, 2014, 1 page.
Coolcentric "Products—Coolcentric Coolant Distribution Units", pp. 1-2, website, http://www.coolcentric.com/products/coolant-distribution_units.php, Feb. 22, 2012.
Coolcentric "Products—Technology Overview", pp. 1-2, website, http://www.coolcentric.com/products/technology.php, Feb. 22, 2012.
Examination Report issued in corresponding application No. GC2017-32854 dated Jun. 30, 2019, 4 pages.
Examination Report issued in Singapore Patent Application No. 11201807975U dated May 12, 2021.
Garday, Doug et al., "Air-Cooled High-Performance Data Centers: Case Studies and Best Methods"; Intel Corporation, Nov. 2006, 20 pages.
HP Modular Cooling System Site Preparation Guide; Hewlette-Packard Development Company, L.P. Feb. 2007 (Second Edition), 84 pages.
Hybrid Blue—Jaeggi advanced dry cooler, Jaeggi Hybridcoolers, Technical Data Sheets, Jun. 8, 2014, 9 pages.
Jeffrey D. Rambo, "Reduced-Order Modeling of Multiscale Turbulent Convection: Application to Data Center Thermal Management"; A Dissertation Presented to the Academic Faculty, Georgia Institute of Technology, May 2006, 138 pages.
Krishna Kant, "Data Center Evolution; 2009; A Tutorial on State of the Art, Issues, and Challenges", Computer Networks, 53 (2009, pp. 2939-2965.
Liebert Xtreme Density—System Design Manual, Emerson Network Power, 83 pages.
Moore, Justin et al., "Weatherman: Automated, Online, and Predictive Thermal Mapping and Management for Data Centers"; IEEE, 2006, 10 pages.
Notification of Transmittal of the International Search Report and the Written Opinion of the International Searching Authority, or the Declaration issued in corresponding PCT application No. PCT/US2016/057912 dated Mar. 28, 2017.
Second Examination report issued in GCC application No. GC 2017-32854 dated Jun. 17, 2020, 4 pages.
Stulz Solutions and Services free cooling/adiabatic/trim, Stulz, Technical Data Sheets, Feb. 2014, 24 pages.
Sylvain Quoilin and Vincent Lemort, "Technological and Economical Survey of Organic Rankine Cycle Systems", symposium paper, Thermodynamics Laboratory, University of Liege—5th European Conference Economics and Management of Energy in Industry—Algarve, Portugal Centro de Energia e Tecnologia; Apr. 14-17, 2009, pp. 1-12.
Request for Submission of an Opinion issued in Korean Patent Application No. 10-2018-7029176 dated Dec. 19, 2022 with English translation.
Notice of Allowance issued in Korean Application No. 10-2018-0729176 dated Aug. 8, 2023 with English translation.

\* cited by examiner

SYSTEM AND METHODS UTILIZING FLUID COOLERS AND CHILLERS TO PERFORM IN-SERIES HEAT REJECTION AND TRIM COOLING

BACKGROUND

Present day chillers require significant power to produce process and cooling water. Air-cooled condensing chillers draw significantly more power (higher kW/ton) than water-cooled condensing chillers (lower kW/ton). Water-cooled chillers are more efficient from a power consumption perspective; however, this efficiency comes with a high cost of water consumption by the water-cooled chillers.

Modern water-cooled chillers can be paired with a free cooling apparatus such as an apparatus including plate frame heat exchangers. The free cooling apparatus is intended to provide some supplemental cooling with or without compressor assistance during cooler seasonal operation in an effort to reduce overall power use annually. These systems require complicated water flow control systems and swing over valves to facilitate transition in and out of free cooling modes. The transition in and out of free cooling can be risky, and relies on an operator interface to mitigate risk. Typical problems arise on transition in which a chiller can lock itself out from commencing operation on low back pressure safety control when commanded to energize with low temperature condenser water present.

Present day air-cooled chillers can be provided with free cooling coils. Most of these chillers are designed with either an evaporator or free cooling coil path of water flow. As such, the transition from free cooling to mechanical cooling can be a risky transition, and require time delays and complicated control sequences.

Water chillers are produced in a highly commoditized market. Therefore, costs are a consideration and free cooling coils are rarely oversized to facilitate increased free cooling capability.

Traditional chillers rely on supporting pumping systems. These pumping systems draw significant power. They draw the second highest amount of power in a cooling system behind chiller compressors. A typical evaporator pump delivers approximately 7.6-9.1 lpm/ton (liters per minute/ton) flow to a chiller evaporator, based on a 5.6-6.7 delta T ° C. A typical condenser water pump delivers approximately 9.5-11.4 lpm/ton of flow to a chiller condenser for operation. The average water-cooled chiller system requires approximately 18.6-20.4 lpm/ton of pumping.

The operating efficiency of a traditional chiller compression cycle is subject to the external environmental conditions. The higher the ambient dry bulb temperature (air cooled) or wet bulb temperature (water cooled), the higher the compression ratio is, which elevates the "lift" that the compressor must overcome. This lift effect requires increased compressor power to overcome the lift under high-temperature operation.

The stable operation of the traditional chiller compression cycle is subject to the external environmental conditions. The lower ambient dry bulb temperature (air cooled) or wet bulb temperature (water cooled), the lower the compression ratio is, which can pose operational risks to the system. Low temperature environmental operation of a compressor can affect the stability of the refrigerant process. A system that has too close a lift condition (high pressure versus low pressure delta p) can cause instability of the refrigerant circuit and lead to systemic reliability problems. Hot gas bypass can alleviate these problems; however, this is energy inefficient.

Present day chiller plants that serve noncritical systems generally are piped with traditional single pipe systems. Critical systems that serve data centers are usually piped with dual pathways of piping, and the ability to concurrently isolate for the purposes of maintenance or replacement of any segment of the pipe circuit, or the equipment, such as the chillers. This is a costly way to build, maintain, and replace segments of the pipe circuit, and poses additional risk to the critical load when maintenance and replacement work is performed. Present day air-cooled chillers also have integrated or packaged evaporator and condensing sections.

SUMMARY

In one aspect, the present disclosure features a cooling apparatus. The cooling apparatus includes a fluid cooler and a chiller. The fluid cooler includes wet media, a first fluid circuit configured to provide fluid to the wet media, a free cooling air to fluid heat exchanger disposed adjacent to the wet media, and an air to refrigerant heat exchanger disposed adjacent to the free cooling air to fluid heat exchanger. The chiller includes a second fluid circuit in fluid communication with the free cooling air to fluid heat exchanger, an evaporator in fluid communication with the second fluid circuit, and a refrigerant circuit, which includes a compressor, in fluid communication with the evaporator and in fluid communication with the air to refrigerant heat exchanger.

In aspects, the wet media is adiabatic wet media. In aspects, the free cooling air to fluid heat exchanger may be a micro channel free cooling air to fluid heat exchanger and the air to refrigerant heat exchanger may be a micro channel direct expansion condensing coil.

In aspects, the cooling apparatus further includes (a) a first cooling assembly including a first enclosure containing the wet media, the free cooling air to fluid heat exchanger, and the air to refrigerant heat exchanger, and (b) a second cooling assembly including a second enclosure containing second wet media coupled to the first fluid circuit that is further configured to distribute fluid across the second wet media, a second free cooling air to fluid heat exchanger disposed adjacent to the second wet media and in fluid communication with the first fluid circuit, and a second air to refrigerant heat exchanger disposed adjacent to the second free cooling air to fluid heat exchanger and in fluid communication with the refrigerant circuit. In aspects, the fluid cooler includes a first side and a second side opposite the first side, and the first cooling assembly is disposed on the first side and the second cooling assembly is disposed on the second side.

In aspects, the cooling apparatus further includes a piping module in fluid communication with the fluid cooler and the chiller. The piping module couples to another fluid cooler, another chiller, and another piping module to allow for the modular expansion of the cooling apparatus.

In another aspect, the present disclosure features a cooling method. The cooling method includes sensing a first temperature at a first location in a fluid circuit and determining whether the first temperature is greater than a first predetermined temperature. If the first temperature is not greater than the first predetermined temperature, the fluid circuit is cooled using the ambient air, and, if the first temperature is greater than the first predetermined temperature, the fluid circuit is cooled using the ambient air and a refrigeration circuit. The cooling method further includes sensing a dry bulb temperature of the ambient air and sensing a second temperature at a second location in the fluid circuit, and determining whether the sensed dry bulb temperature is greater than the sensed second temperature. If the sensed dry bulb temperature is greater than the sensed second temperature, the fluid circuit is cooled using the refrigeration circuit.

In aspects, the cooling method further includes determining whether fan power is greater than a predetermined power. If the fan power is not greater than the predetermined power, the fluid circuit is cooled using the ambient air, and if the fan power is greater than the first predetermined temperature, the fluid circuit is cooled using the ambient air and a refrigeration circuit.

In aspects, the cooling method further includes sensing a wet bulb temperature of the ambient air and determining whether the sensed wet bulb temperature is less than a predetermined wet bulb temperature. If the sensed wet bulb temperature is less than a predetermined wet bulb temperature, the fluid circuit is cooled using the ambient air, and, if the sensed wet bulb temperature is not less than a predetermined wet bulb temperature, the fluid circuit is cooled using the ambient air and a refrigeration circuit.

In aspects, the cooling method may further include sensing a dry bulb temperature of the ambient air, sensing the second temperature at the second location in the fluid circuit, and determining whether the sensed dry bulb temperature is less than the sensed second temperature minus a predetermined number of degrees. If the sensed dry bulb temperature is not less than the sensed second temperature, the fluid circuit is cooled using the refrigeration circuit, and, if the sensed dry bulb temperature is less than the sensed second temperature, the fluid circuit is cooled using the ambient air and the refrigeration circuit.

In another aspect, the present disclosure features a cooling method. The cooling method includes sensing a dry bulb temperature and a wet bulb temperature of ambient air and operating a fluid cooler and a chiller according to one of multiple modes based on the sensed dry bulb temperature and sensed wet bulb temperature of the ambient air. In a free cooling dry operational mode, a fluid circuit of the fluid cooler is cooled by ambient air, if the sensed wet bulb temperature is less than a predetermined wet bulb temperature. In a free cooling wet operational mode, the fluid circuit of the fluid cooler is cooled by ambient air that has been cooled by wet media, if the sensed wet bulb temperature is less than a predetermined wet bulb temperature and the sensed dry bulb temperature is greater than a predetermined dry bulb temperature.

In a partial free cooling dry operational mode, the fluid circuit is cooled by ambient air and by a refrigerant circuit, if a fluid circuit temperature is greater than a fluid circuit temperature setpoint. In a partial free cooling wet operational mode, the fluid circuit is cooled by a refrigerant circuit and by ambient air that has been cooled by wet media, if a fluid circuit temperature is greater than a fluid circuit temperature setpoint and the sensed dry bulb temperature is greater than the predetermined dry bulb temperature.

In a mechanical cooling dry operational mode, the fluid circuit is cooled by the refrigerant circuit, if the sensed dry bulb temperature is greater than a fluid circuit temperature. In a mechanical cooling wet operational mode, the fluid circuit is cooled by the refrigerant circuit and ambient air that has been cooled by wet media, if the sensed dry bulb temperature is greater than the fluid circuit temperature and the sensed dry bulb temperature is greater than the predetermined dry bulb temperature.

In still another aspect, the present disclosure features a cooling system including a fluid cooler, a chiller, a first cooling distribution unit (CDU), a second CDU, and an air circulator. The fluid cooler includes wet media coupled to a fluid circuit for distributing fluid across the wet media, a free cooling air to fluid heat exchanger disposed adjacent to the wet media, and an air to refrigerant heat exchanger disposed adjacent to the free cooling air to fluid heat exchanger. The chiller includes a first fluid circuit in fluid communication with the free cooling air to fluid heat exchanger, a chiller evaporator in fluid communication with the fluid circuit, and a refrigerant circuit, which includes a compressor, in fluid communication with the chiller evaporator and in fluid communication with the air to refrigerant heat exchanger.

The first CDU includes a first condenser in fluid communication with the chiller evaporator, a first CDU evaporator in fluid communication with the first condenser, and a first receiver in fluid communication with the first CDU evaporator and the first condenser. The second CDU is coupled in series with the first CDU and includes a second condenser in fluid communication with the chiller evaporator, a second CDU evaporator in fluid communication with the second condenser, and a second receiver in fluid communication with the second CDU evaporator and the second condenser. The first CDU evaporator and the second CDU evaporator are arranged in series with the air circulator.

In aspects, the cooling system further includes a fluid pump assembly coupled between the chiller and the first and second CDUs. The fluid pump assembly pumps fluid between the chiller and the first and second CDUs. In aspects, the fluid pump assembly includes a plurality of fluid pumps. In aspects, the plurality of fluid pumps includes a redundant fluid pump. In aspects, the fluid pump assembly includes a plurality of pipe feeds.

In aspects, the cooling system further includes a master controller associated with the fluid pump assembly. The master controller communicates with a slave controller associated with the fluid cooler and the chiller. In aspects, the master controller includes a lead master controller and a redundant master controller. In aspects, the fluid cooler operates in either a dry mode or a wet mode.

In aspects, the master controller enables the wet mode and enables an evaporative system of the fluid cooler if outdoor air dry bulb temperature is greater than a first predetermined dry bulb temperature and a fan speed is greater than a predetermined fan speed. In aspects, the master controller enables the dry mode and disables an evaporative system of the fluid cooler if the outdoor air dry bulb temperature is less than a second predetermined dry bulb temperature. In aspects, the master controller switches operation of the fluid cooler between the dry mode and the wet mode.

In aspects, the fluid cooler is a first fluid cooler, the chiller is a first chiller, the cooling system further includes a second fluid cooler and a second chiller, and the master controller selectively enables the first fluid cooler, the first chiller, the second fluid cooler, and the second chiller. In aspects, the master controller individually switches operation of each of the first fluid cooler and the second fluid cooler between the dry mode and the wet mode.

In aspects, in a free cooling mode, the master controller enables the first fluid cooler and the second fluid cooler to operate to maintain a chilled fluid supply temperature setpoint. In aspects, in partial or full mechanical cooling mode, the master controller determines the number of fluid coolers and chillers to enable based on the calculated load and a minimum chilled fluid flowrate. In embodiments, the load is calculated based on a measured total IT load on the system.

In aspects, in partial or full mechanical cooling mode, the master controller enables the first fluid cooler and the first chiller, determines whether a load amount is increasing, determines whether the load amount is greater than a first predetermined load amount, and if it is determined that the load amount is increasing and the load amount is greater than the first predetermined load amount, enables the second fluid cooler and the second chiller to operate. In aspects, in partial or full mechanical cooling mode, the master controller determines whether the load amount is decreasing, determines whether the load amount is less than a second predetermined load amount, and if it is determined that the load amount is decreasing and the load amount is less than the second predetermined load amount, disables operation of the second fluid cooler and the second chiller. In aspects, the number of units enabled or disabled by the master controller is limited to a predetermined number of units within a predetermined period.

In aspects, the master controller measures ambient temperature and determines an operating mode based on the measured ambient temperature. In aspects, the master controller measures the ambient temperature, determines whether the measured ambient temperature is greater than a first predetermined temperature, and determines whether the measured ambient temperature is greater than a second predetermined temperature, which is greater than the first predetermined temperature. If it is determined that the measured ambient temperature is not greater than the first predetermined temperature, the master controller operates the first fluid cooler and the second fluid cooler in a free cooling mode. If it is determined that the measured ambient temperature is greater than the first predetermined temperature and less than the second predetermined temperature, the master controller operates the first fluid cooler, the second fluid cooler, the first chiller, and the second chiller in a partial free cooling mode. If it is determined that the measured ambient temperature is greater than the second predetermined temperature, the master controller disables the first fluid cooler and the second fluid cooler and operates the first chiller and the second chiller in a mechanical cooling mode.

In aspects, the chiller includes a local controller and, in a mechanical cooling mode, the master controller transfers control to a local controller of the chiller. In aspects, the chiller includes a local controller, in the mechanical cooling mode, the master controller transfers control to the local controller of the chiller, and the local controller controls the speed of a fan to maintain a setpoint of a discharge pressure of the compressor.

In aspects, the chiller includes a fan, and, if the chiller is operating in a free cooling mode, the master controller controls the speed of the fan based on a chilled fluid supply temperature setpoint.

In aspects, the master controller varies the chilled fluid supply temperature setpoint based on an IT load. In aspects, the master controller determines which of the first CDU or the second CDU has the highest load and varies the chilled fluid supply temperature setpoint based on the CDU determined to have the highest load.

In still another aspect, the present disclosure features a modular cooling system. The modular cooling system includes a first pipe cage assembly, a first cooling distribution unit (CDU), a second CDU, a second pipe cage assembly, a chiller, and a fluid cooler. The first pipe cage assembly includes a first plurality of first pipes and a second pipe, a first pipe connector coupled to each end portion of each of the plurality of first pipes, a second pipe connector coupled to each end portion of the second pipe, and a plurality of third pipe connectors coupled between the end portions of each of the plurality of first pipes. The first CDU is fluidly coupled to the second pipe connector coupled to a first end portion of the second pipe and to at least two of the plurality of third pipe connectors. The second CDU is fluidly coupled to the second pipe connector coupled to a second end portion of the second pipe so that the second CDU is in series with the first CDU, and to at least another two of the plurality of third pipe connectors. The second pipe cage assembly includes a second plurality of first pipes, a first pipe connector coupled to each end portion of each of the second plurality of first pipes, and a plurality of third pipe connectors coupled between the end portions of each of the second plurality of first pipes. The first pipe connectors at a first end portion of the second pipe cage assembly is fluidly coupled to the first pipe connectors at a first end portion of the first pipe cage assembly. The chiller is fluidly coupled to at least two of the plurality of third pipe connectors. The fluid cooler is fluidly coupled to the chiller.

In aspects, the fluid cooler includes wet media coupled to a fluid circuit for distributing fluid across the wet media, a free cooling air to fluid heat exchanger disposed adjacent to the wet media, and an air to refrigerant heat exchanger disposed adjacent to the free cooling air to fluid heat exchanger.

In aspects, the first CDU and the second CDU each include a condenser, an evaporator fluidly coupled to the first condenser, and a receiver fluidly coupled to the evaporator and the condenser.

In aspects, the modular cooling system includes a bridge valve assembly having valves and third pipe connectors coupled to each side of each of the valves. The third pipe connectors coupled to a first side of each of the valves are coupled to the first pipe connectors coupled to a first end portion of the pipes.

In aspects, the modular cooling system further includes a pump assembly having fluid pumps. The fluid pumps are fluidly coupled to respective second sides of the valves.

In aspects, the modular cooling system includes a second bridge valve assembly having second valves and fourth pipe connectors coupled to each side of each of the second valves. The fourth pipe connectors coupled to a first side of each of the second valves are coupled to the first pipe connectors coupled to a second end portion of the pipes.

In aspects, the pipes include at least one cooling fluid return pipe and at least one cooling fluid supply pipe.

In aspects, the modular cooling system includes a chiller having a fluid circuit in fluid communication with the free cooling air to fluid heat exchanger, a chiller evaporator in fluid communication with the fluid circuit, and a refrigerant circuit, which includes a compressor, in fluid communication with the chiller evaporator and in fluid communication with the air to refrigerant heat exchanger.

In another aspect, the present disclosure features a method of assembling a modular cooling system. The method includes coupling a first side of a pipe cage assembly having pipes to a first side of a first bridge valve assembly having respective first valves, coupling a first side of a second bridge valve assembly having respective second valves to a second side of the pipe cage assembly, coupling a cooling distribution unit (CDU) to a third side of the pipe cage assembly, and coupling a fluid cooler to the CDU.

In aspects, first pipe connectors are coupled to each end portion of each of the pipes, second pipe connectors are coupled between the end portions of each of the pipes, third pipe connectors are coupled to each side of each of the first valves, and fourth pipe connectors are coupled to each side of each of the second valves. In aspects, coupling the first side of the pipe cage assembly to the first side of the first bridge valve assembly includes coupling the third pipe connectors coupled to a first side of the first valves to the respective first pipe connectors coupled to a first end portion of the pipes. In aspects, coupling the first side of the second bridge valve assembly to the second side of the pipe cage assembly includes coupling the fourth pipe connectors coupled to the first side of each of the second valves to the respective first pipe connectors coupled to the second end portion of the pipes. In aspects, coupling the CDU to the third side of the pipe cage assembly includes coupling the CDU to the second pipe connectors.

In another aspect, the present disclosure features a method of operating a cooling system. The method includes determining whether a load amount is increasing or decreasing, if the load amount is increasing, determining whether the load amount is greater than a first predetermined load amount, if the load amount is increasing and the load amount is greater than the first predetermined load amount, enabling a fluid cooler and a chiller to operate, if the load amount is decreasing, determining whether the load amount is less than a second predetermined load amount, and if the load amount is decreasing and the load amount is less than the second predetermined load amount, disabling operation of a fluid cooler and a chiller.

In aspects, the method of operating the cooling system includes determining a number of enabled fluid cooler/chiller units, determining the first predetermined load amount based on the determined number of enabled fluid cooler/chiller units, and determining the second predetermined load amount based on the determined number of enabled fluid cooler/chiller units.

In aspects, the method of operating the cooling system includes starting a cooling system in a free cooling mode, determining whether a cooling fluid supply temperature is greater than a first cooling fluid supply temperature setpoint, if it is determined that the cooling fluid supply temperature is greater than the first cooling fluid supply temperature setpoint, changing the cooling mode to a partial free cooling mode, determining whether a dry bulb temperature is greater than a cooling fluid return temperature, and, if it is determined that the dry bulb temperature is greater than the cooling fluid return temperature, changing the cooling mode to a mechanical cooling mode.

In aspects, the method of operating the cooling system includes determining whether a wet bulb temperature is less than a predetermined wet bulb temperature, and, if it is determined that the wet bulb temperature is less than the predetermined wet bulb temperature, changing the cooling mode to the free cooling mode.

In aspects, the method of operating the cooling system includes determining whether the dry bulb temperature is less than the cooling fluid return temperature, and, if it is determined that the dry bulb temperature is less than the cooling fluid return temperature, changing the cooling mode to the partial free cooling mode.

In aspects, the method of operating the cooling system includes determining whether the fan power is greater than a predetermined power, and, if it is determined that the fan power is greater than the predetermined power, changing the cooling mode to the partial free cooling mode.

In aspects, in the free cooling mode, the method of operating the cooling system includes enabling all fluid coolers, determining whether the cooling fluid supply temperature is greater than a second cooling fluid supply temperature setpoint, and if it is determined that the cooling fluid supply temperature is greater than the second cooling fluid supply temperature setpoint, enabling control of the fan speed to maintain the cooling fluid supply temperature at the second cooling fluid supply temperature setpoint.

In aspects, in the partial free cooling mode, the method of operating the cooling system includes modulating speed of fans in the fluid coolers to maintain average temperature of cooling fluid leaving the fluid coolers at a predetermined temperature setpoint, determining whether the work performed by the fans is greater than a predetermined work amount for a first predetermined period, if it is determined that the work performed by the fans is greater than the predetermined work amount for the first predetermined period, reducing the temperature setpoint, determining whether the cooling fluid supply temperature is greater than a cooling fluid supply temperature setpoint for a second predetermined period, and, if it is determined that the cooling fluid supply temperature is greater than a cooling fluid supply temperature setpoint for a second predetermined period, reducing the temperature setpoint.

In aspects, the method of operating the cooling system includes determining whether a command has been received to enable a chilled fluid system, if it is determined that a command has been received to enable the chilled fluid system, enabling a lead chilled fluid pump and controlling a speed of the lead chilled fluid pump to maintain a differential pressure between a chilled fluid supply feed pipe and a chilled fluid return feed pipe, determining whether the speed of lead chilled fluid pump is greater than a predetermined speed for a predetermined period, and if it is determined that the speed of lead chilled fluid pump is greater than a first predetermined speed for a first predetermined period, enabling a lag chilled fluid pump and controlling a speed of the lead chilled fluid pump and the lag chilled fluid pump to maintain a differential pressure between a chilled fluid supply feed pipe and a chilled fluid return feed pipe.

In aspects, the method of operating the cooling system includes determining whether the speed of the lead chilled fluid pump and the speed of the lag chilled fluid pump is less than a second predetermined speed for a second predetermined period, and, if it is determined that the speed of the lead chilled fluid pump and the speed of the lag chilled fluid pump is less than a second predetermined speed for a second predetermined period, stopping the lag chilled fluid pump and controlling the speed of the lead chilled fluid pump to maintain a differential pressure between a chilled fluid supply feed pipe and a chilled fluid return feed pipe.

In aspects, the method of operating the cooling system includes starting the fluid cooler in a dry mode in which a fluid is not provided to the wet media of the fluid cooler, measuring a dry bulb temperature of outdoor air, determining whether the measured dry bulb temperature is greater than a dry bulb temperature, determining whether the speed of the fans in the fluid cooler is greater than a predetermined fan speed, and, if it is determined that the measured dry bulb temperature is greater than the dry bulb temperature and the speed of the fans in the fluid cooler is greater than the predetermined fan speed, changing from the dry mode to a wet mode in which the fluid is provided to the wet media of the fluid cooler.

In aspects, the method of operating the cooling system includes measuring a dry bulb temperature of outdoor air, determining whether the measured dry bulb temperature is less than an enabling dry bulb temperature, and, if it is determined that the measured dry bulb temperature is less than an enabling dry bulb temperature, changing from the wet mode to the dry mode.

In aspects, the method of operating the cooling system includes determining whether the fan power is greater than a predetermined power, and if it is determined that the fan power is greater than a predetermined power, changing from the dry mode to the wet mode.

In another aspect, the present disclosure features a method of assembling a modular cooling system. The method includes installing a first pipe cage module, coupling a first chiller to a first side of the pipe cage module, coupling a first fluid cooler to the first chiller, coupling a bridge valve assembly to a third side of the pipe cage module. If demand for cooling capacity increases above a first threshold, the method includes coupling a second chiller to a second side of the pipe cage module, and coupling a second fluid cooler to the second chiller. If demand for cooling capacity further increases above a second threshold, the method includes coupling a second pipe cage module to the bridge valve assembly, coupling a third chiller to a second side of the second pipe cage module, and coupling a third fluid cooler to the third chiller.

In another aspect, the present disclosure features a modular cooling system including a first pipe cage module, a first chiller coupled to a first side of the first pipe cage module, a first fluid cooler fluidly coupled to the first chiller, a second chiller coupled to a second side of the first pipe cage module, a second fluid cooler fluidly coupled to the second chiller, a bridge valve assembly coupled to a third side of the first pipe cage module, a second pipe cage module to the bridge valve assembly, a third chiller coupled to a side of the second pipe cage module, and a third fluid cooler coupled to the third chiller.

DETAILED DESCRIPTION

The hybrid cooler/chiller system according to embodiments of the present disclosure can be a single package unit, a 2n redundant unit, or a modular array of units. It incorporates a cooling cycle that can operate under a broad array of environmental conditions, utilizing free cooling as the primary operation mode with supplemental partial mechanical assist mode or partial free cooling mode for extreme weather conditions. The cooling systems and apparatus of the present disclosure are intended to operate in dry mode for significantly more hours per year than even the most efficient water-cooled chiller plants. The cooling apparatus and systems of the present disclosure can be utilized for comfort or people cooling, and exhibit significant reductions in power and water consumption versus traditional chillers. The cooling apparatus and systems of the present disclosure exhibit the greatest power and water consumption conservation in applications such as industrial, pharmaceutical, data center, and other high heat extraction cycles. The cooling systems and apparatus also exhibit significant reductions in pumping horsepower use in addition to power and water conservation. The cooling systems and apparatus are compatible with pumped refrigerant cycles utilized in data centers for absorbing heat without the use of compressors.

In embodiments, the cooling system includes a fluid cooler, a chiller fluidly connected to the fluid cooler and which may be integrated with the fluid cooler, a pump skid or pump house fluidly connected to the chiller, a pipe cage module for fluidly connecting a cooling distribution unit (CDU) to the pump house, and a plurality of evaporators fluidly connected to the CDU as illustrated in FIGS. 1A-1D.

Figure 1A:
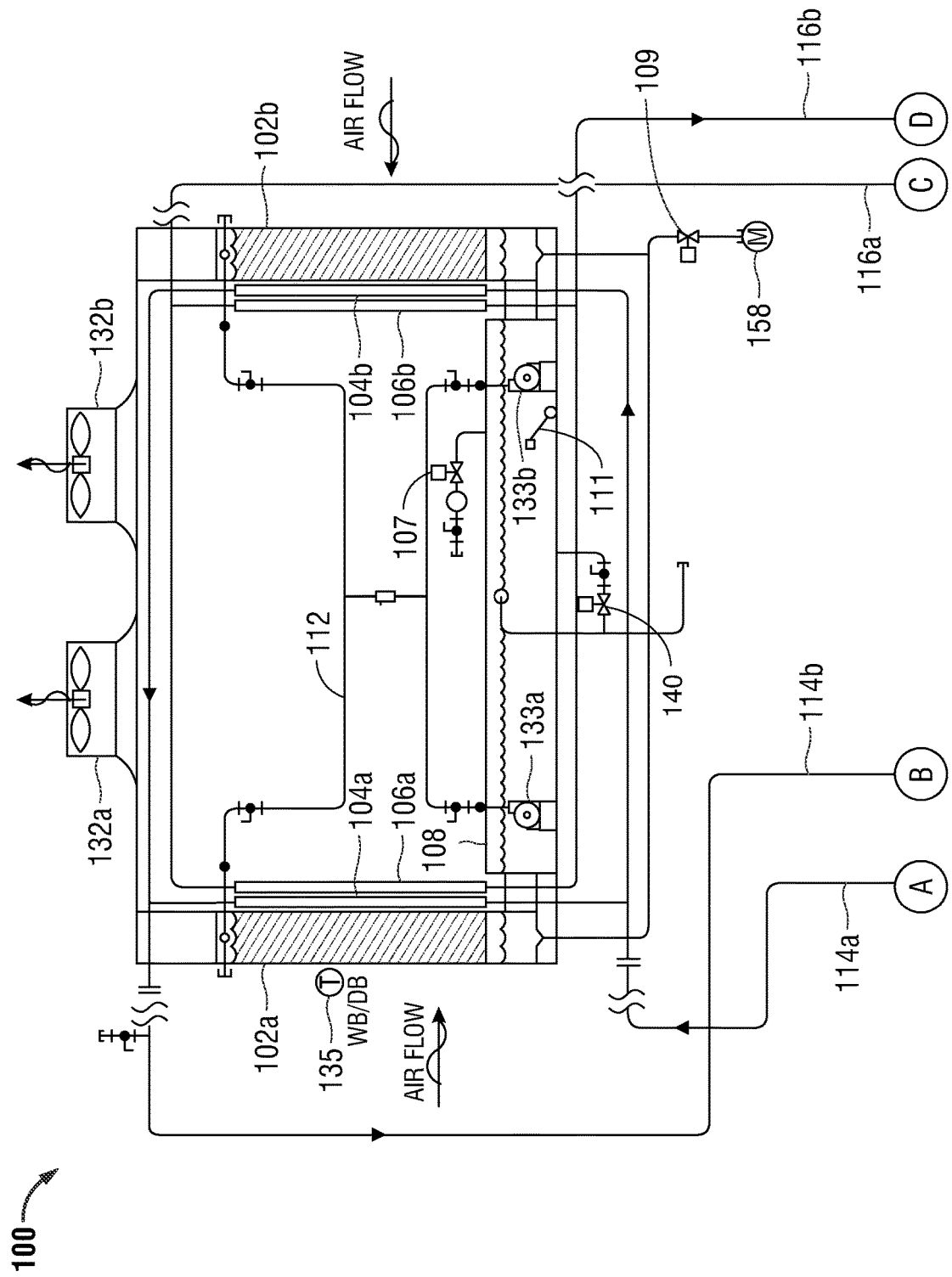
FIG. 1A is a circuit block diagram of a fluid cooler according to embodiments of the present disclosure.

FIG. 1A is a circuit block diagram of a fluid cooler 100 that includes wet media 102a, a free cooling air to water heat exchanger 104a, and an air to refrigerant heat exchanger 106a. The water circuit 112 supplies water to the wet media 102a, which may be adiabatic wet media. The water cascades down the wet media 102a and is collected in a reservoir or basin 108 below the wet media 102a so that the water can be recycled. The water supplied to the wet media 102a may be controlled based on the outside temperature and the elevation. The free cooling air to water heat exchanger 104a is disposed next to the wet media 102a and the air to refrigerant heat exchanger 104a is disposed next to the free cooling air to water heat exchanger 106a.

The fluid cooler 100 includes four walls or sides and a roof to form an enclosure. At least two fans 132a, 132b are disposed on the roof. The fans 132a, 132b may be variable speed fans. The wet media 102a, the free cooling air to water heat exchanger 104a, and the air to refrigerant heat exchanger 106a are disposed near or around one of the four walls or sides. In operation, the at least two fans 132a, 132b draw air through the wet media 102a, the free cooling air to water heat exchanger 104a, the air to refrigerant heat exchanger 106a, and the inside of the enclosure, and then discharges the air outside of the fluid cooler 100.

The fluid cooler 100 also includes wet media 102b, a free cooling air to water heat exchanger 104b, and an air to refrigerant heat exchanger 106b disposed near or around a second wall or side that is opposite the first wall or side. The wet media 102b, which may be adiabatic wet media, is coupled to the water circuit 112 for distributing water across the wet media 102b. The fluid cooler 100 includes water pumps 133a, 133b, which are disposed in a water reservoir or basin 108, for pumping water or a water solution through the water circuit 112. The free cooling air to water heat exchanger 104b is disposed next to the wet media 102b and the air to refrigerant heat exchanger 104b is disposed next to the free cooling air to water heat exchanger 106b.

The fluid cooler 100 includes a sensor (not shown) for monitoring water quality. For example, the sensor may measure conductivity. A local controller, e.g., a PLC controller, disposed in the fluid cooler 100 or the chiller 110 measures the water quality and determines whether the water quality goes below a threshold. If the local controller determines that the water quality is less than the threshold, the local controller opens the bleed solenoid valve 109 to allow the water or water solution in the reservoir 108 to flow out of the fluid cooler 100. The fluid cooler 100 includes a flow meter 158 that measures the amount of water flowing out of the reservoir 108 and provides those measurements to the local controller, so that the local controller can precisely control the flow of water out of the reservoir 108.

To maintain the water at a desired level in the reservoir 108, the fluid cooler 100 includes a level sensor 111, which provides measurements of the level of the water in the reservoir 108 to the local controller. If the local controller determines that the level of the water or water solution in the reservoir 108 is less than a predetermined level, the local controller opens the make-up solenoid valve 107 to allow fresh water to fill the reservoir 108 to a desired level.

The fluid cooler 100 also includes a drain solenoid valve 140. The local controller causes the drain solenoid valve 140 to open when the outside air temperature goes below a predetermined low temperature threshold to cause all the water or water solution in the reservoir 108 to drain to protect against freezing. The local controller also causes the drain solenoid valve 140 to open in the dry mode to drain all water in the reservoir 108 to prevent the growth of bacteria in the reservoir 108.

Figure 1B:
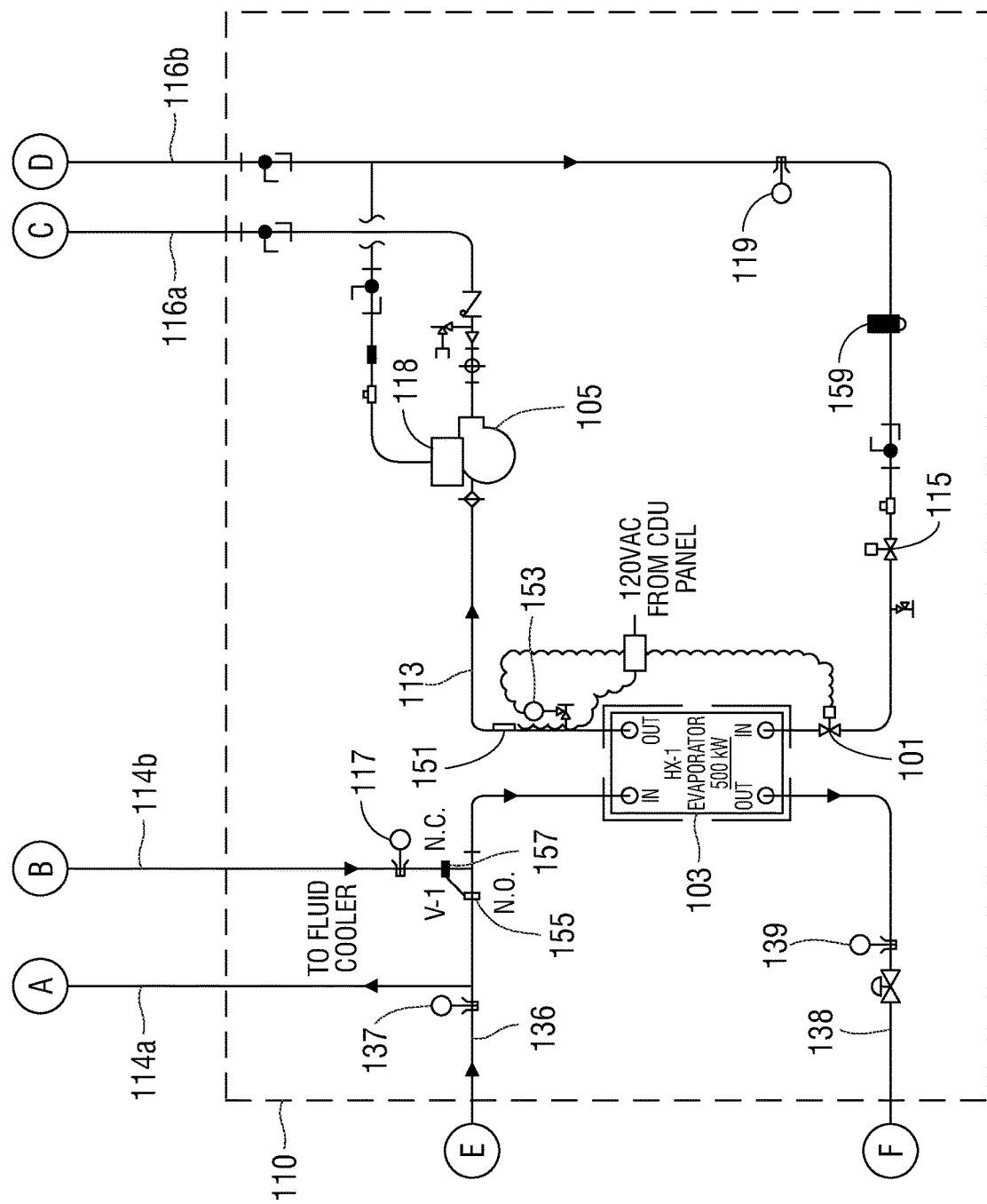
FIG. 1B is a circuit block diagram of a chiller according to embodiments of the present disclosure.
Figure 1C:
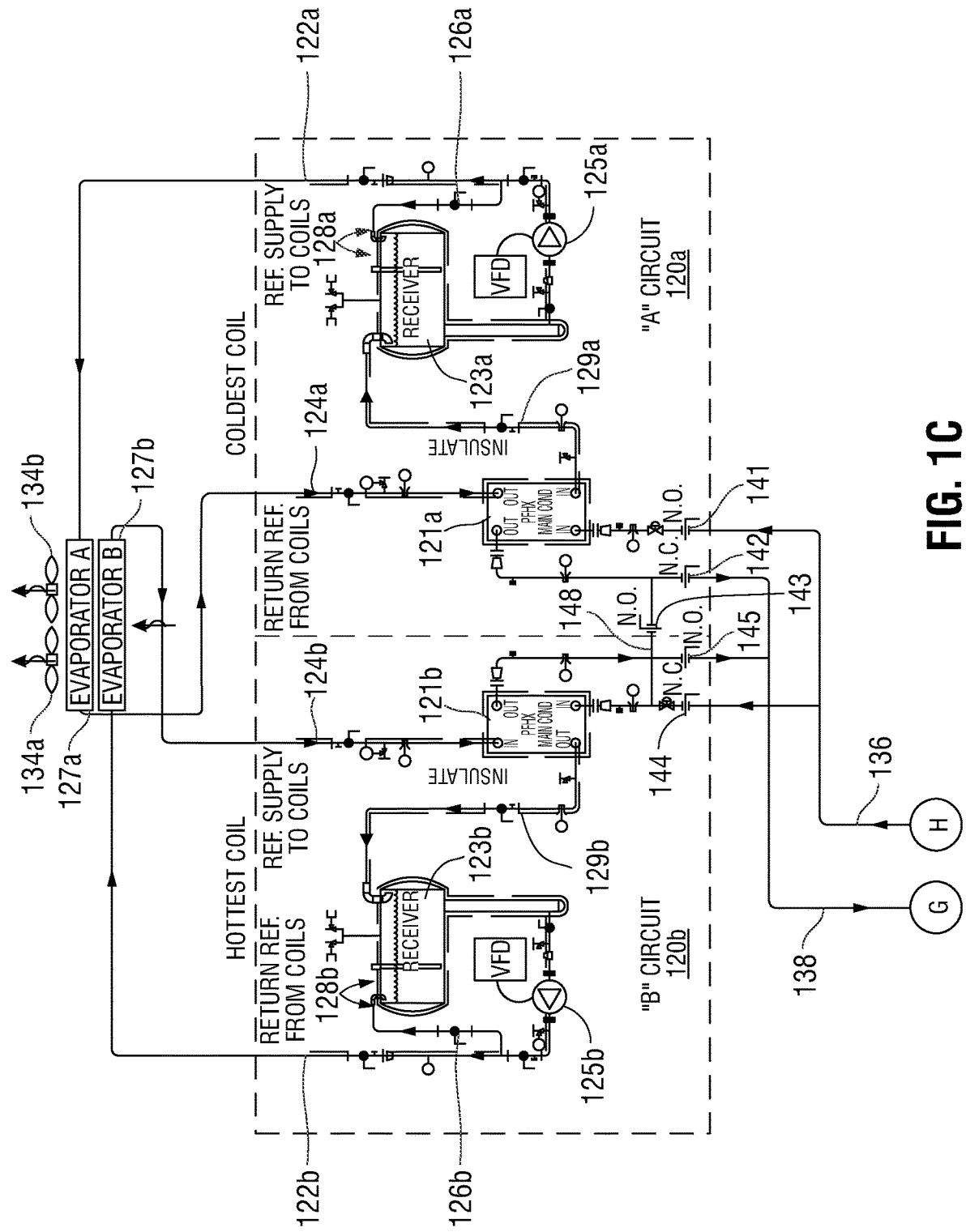
FIG. 1C is a circuit block diagram of a cooling distribution unit coupled to evaporators and fans according to embodiments of the present disclosure.

FIG. 1B is a circuit block diagram of a chiller 110 that is in thermal communication with the fluid cooler 100 of FIG. 1A and the CDU 120 of FIG. 1C, and operates to provide mechanical cooling when needed. The chiller 110 includes an expansion valve 101, an evaporator 103, and a compressor 105. The compressor 105 is in fluid communication with the air to refrigerant heat exchangers 106a, 106b via lines 116a, 116b to form a refrigerant circuit. The chiller 110 of FIG. 1B also includes an inverter 118 for operating the compressor 105. The chiller 110 also includes a liquid line solenoid valve 115, which prevents flooding of the evaporator 103 during start up.

The fluid lines 114a, 114b are in fluid communication with the free cooling air to water heat exchangers 104a, 104b, and circulate water or a water solution through the free cooling air to water heat exchangers 104a, 104b. The fluid lines 136, 138 are in fluid communication with the fluid lines 114a, 114b to provide water or a water solution from the fluid pump assembly 130 to the fluid cooler 100. The fluid lines 136, 138 are also in fluid communication with the evaporator 103 and circulate water or a water solution from the fluid pump assembly 130 through the evaporator 103. The chiller 110 also includes a valve 155 for controlling the flow of water or a water solution from the fluid pump assembly 130 to the evaporator 103 via line 136, and a valve 157 for controlling the flow of water or a water solution from the fluid cooler 100 to the evaporator 103 via line 114b. In embodiments, valve 155 is a normally-open valve and valve 157 is a normally-closed valve so that in the event of a power failure, the cooling system would default to full mechanical cooling. Thus, when the fluid cooler 100 is operating in the free cooling mode or in the partial free cooling mode, valve 155 is closed and valve 157 is opened to allow water or a water solution to flow from the fluid cooler 100 to the evaporator 103 via line 114b. When the cooling mode transitions from the partial free cooling mode to the full mechanical cooling mode, valve 155 is opened and valve 157 is closed.

The chiller 110 further includes a temperature sensor 119, a temperature sensor 151, and a pressure sensor 153 for taking various measurements, which may be used to control various aspects of the cooling system. The chiller 110 also includes a filter-drier 159.

During operation, a refrigerant is received by the chiller of FIG. 1B in liquid form from the fluid cooler of FIG. 1A via the fluid cooler to chiller evaporator supply line 116b. The liquid refrigerant is then at least partially evaporated in the evaporator 103 via the transfer of heat from the chilled water supply side of the evaporator 103.

The at least partially evaporated refrigerant flows or circulates from the evaporator 103 to the suction side of the compressor 105 via chiller evaporator to compressor suction connection line 113. The compressor 105 compresses the at least partially evaporated refrigerant to a high pressure gas. For example, the compressed high pressure gas may have a pressure range of approximately 135-140 psia (pounds per square inch absolute). The high pressure refrigerant gas circulates from the discharge side of compressor 105 to the fluid cooler of FIG. 1A via compressor discharge to fluid cooler connection line 116a. As described above, heat is transferred from the high pressure refrigerant gas to the outside air that has been cooled by the wet media 102a, 102b via the air to refrigerant heat exchangers 106a, 106b.

The chiller 110 of FIG. 1B also includes a bypass valve 155, which, when opened, causes the cooling water flowing through the cooling water return line 136 to bypass lines 114a, 114b connected to the fluid cooler 100. When operating in the free cooling mode and the partial free cooling mode, the bypass valve 155 is closed and the valve 157 is opened to allow the cooling water to flow through lines 114a, 114b. When the cooling system transitions to the mechanical cooling mode, in which only the chiller 110 is operated to cool the load, the bypass valve 155 is opened to cause chilled water flowing through the chilled water return line to bypass lines 114a, 114b connected to the fluid cooler.

In embodiments, the fluid cooler 100 and the chiller 110 may be integrated into a single fluid cooler/chiller unit or they may be implemented as two separate units. Either way, the fluid cooler 100 and the chiller 110 may operate as a single system. In some embodiments, the local controller for the fluid cooler 100 and the chiller 110 resides in the chiller 110. In embodiments, the chiller 110 feeds power to the fluid cooler 100 to power, among other things, the fluid cooler fans 132a, 132b and the pumps 133a, 133b.

The controls for the fluid cooler 100 and the chiller 110 may be optimized according to the requirements of the operator or owner of the fluid cooler 100 and the chiller 110. For example, some owners may have more sensitivity to power usage (e.g., power may be expensive or power may be supplied from a renewable energy source). To minimize power usage, the wet mode of the fluid cooler 100 (in which the pumps 133a, 133b are operated to spray water or another fluid solution on the wet media 102a, 102b) may be started sooner, e.g., by starting the wet mode at a lower wet bulb temperature setpoint, which is set by the operator. On the other hand, some owners may have more sensitivity to water usage (e.g., the owner may be located in an area where water is in limited supply or is expensive). To minimize water usage, more power may be used to operate the fluid cooler fans 132a, 132b. Thus, the fluid cooler 100 and the chiller 110 system can be optimized for power savings or for water savings.

FIG. 1C is a circuit block diagram of a central distribution unit that is fluidly coupled to first and second evaporators 127a, 127b and first and second fans 134a, 134b. The central distribution unit includes two circuits: a first circuit 120a fluidly coupled to the first evaporator 127a and a second circuit 120b fluidly coupled to the second evaporator 127b. The first circuit 120a includes a first main condenser 121a, a first liquid receiver 123a, and a first liquid refrigerant pump 125a. The second circuit 120b includes a second main condenser 121b, a second liquid receiver 123b, and a second liquid refrigerant pump 125b.

During a first mode of operation, line 136 provides cooling fluid, such as water or a water-based solution, to the first main condenser 121a via normally-open valve 141. After flowing through the first main condenser 121a, the cooling fluid is provided to the second main condenser 121b via series connection line 148 and normally-open valve 143 because valves 142 and 144 are normally closed. After flowing through the second main condenser 121b, the cooling fluid is returned to the chiller 110 of FIG. 1B via normally-open valve 145 and line 138. In this mode of operation, the first circuit 121a is in series with the second circuit 121b.

In a second mode of operation, normally-open valve 143 is closed and normally-closed valves 142, 144 are opened so that the first circuit 121a may operate in parallel with or independently of the second circuit 121b. In the second mode of operation, the cooling fluid is carried to the first main condenser 121a and/or the second main condensers 121b via line 136 and is returned to the chiller of FIG. 1B via line 138.

The first evaporator 127a and the second evaporator 127b supply and return liquid refrigerant via first liquid refrigerant assist cycle supply headers 122a, 122b and first liquid refrigerant assist cycle return headers 124a, 124b, respectively, from first and second liquid refrigerant assist circuits 128a and 128b, respectively.

First liquid refrigerant assist cycle return headers 124a, 124b return to first and second main condensers 121a, 121b, respectively, through which the at least partially vaporized liquid refrigerant is condensed and returned to the first and second liquid receivers 123a, 123b via condenser to liquid receiver supply lines 129a, 129b. A minimum level of liquid refrigerant is maintained in the first and second liquid receivers 123a, 123b. Liquid refrigerant in the first and second liquid receivers 123a, 123b is in fluid communication with the suction side of liquid refrigerant pumps 125a, 125b and is discharged as a pumped liquid via the liquid refrigerant pumps 125a, 125b to the first and second evaporators 127a, 127b via the liquid refrigerant assist cycle supply headers 122a, 122b, respectively.

To ensure minimum recirculation flow in the first and second liquid receivers 123a, 123b, the first liquid receiver 123a may include a bypass control valve 126a that provides fluid communication between the liquid refrigerant assist cycle supply header 122a on the discharge side of first liquid refrigerant pump 125a and the first liquid receiver 123a and/or the second liquid receiver 123b may include a bypass control valve 126b that provides fluid communication between the liquid refrigerant assist cycle supply header 122b on the discharge side of second liquid refrigerant pump 125b and the second liquid receiver 123b.

Figure 1D:
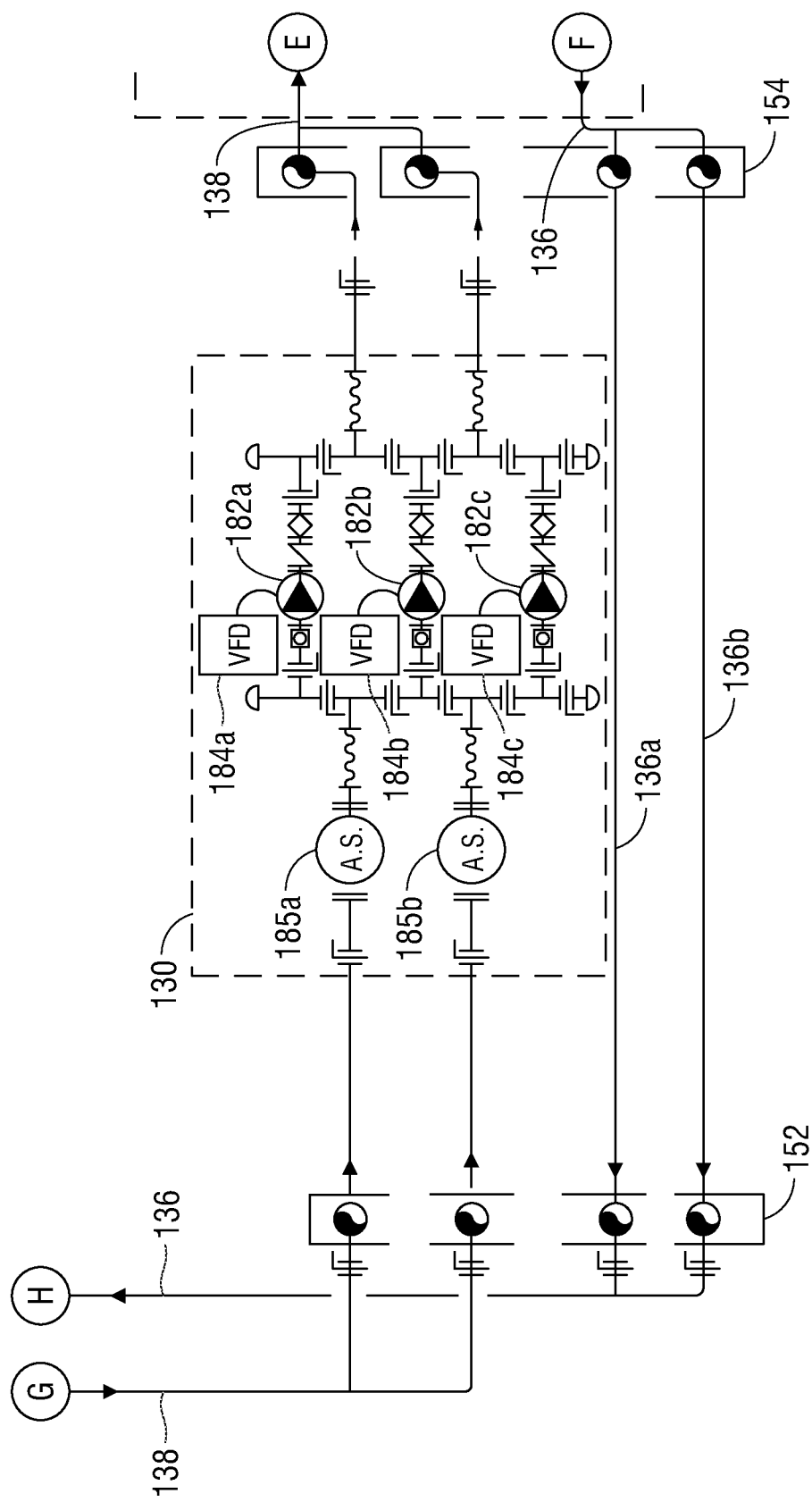
FIG. 1D is a circuit block diagram of a pump assembly and a thermal bus coupled together according to embodiments of the present disclosure.

FIG. 1D is a circuit block diagram of a pump assembly 130, which may be disposed on a pump skid or in a pump house, an indoor thermal bus 152 coupled to one side of the pump assembly 130, and an outdoor thermal bus 154 coupled to the other side of the pump assembly 130. The pump assembly includes chilled water pumps 182a-182c, one of which may be redundant. In embodiments, chilled water pumps 182a is a lead chilled water pump, chilled water pump 182c is a lag chilled water pump, and chilled water pump 182b is a standby chilled water pump. The chilled water pumps 182a-182c are driven by respective variable frequency drives 184a-184c. The pump assembly 130 may be coupled to two return pipe feeds 138a, 138b for redundancy. The return pipe feeds 138 are fluidly coupled to the chilled water pumps 182a-182c via air and dirt separators 185a, 185b, which remove air and dirt from the fluid flowing through the return pipe feeds 138. The cooling system may also include two supply pipe feeds 136a, 136b. During normal operation, the two return pipe feeds 138a, 138b and the two supply pipe feeds 136a, 136b may be utilized. The chilled water pumps 182a-182c circulate chilled water to one or more CDUs (also referred to as pumped refrigeration units), one of which is depicted in FIG. 1C.

In embodiments, the fluid cooler 100, the chiller 110, the cooling distribution unit 120, or the pump assembly 130 may be integrated or combined with one or more of the other apparatuses. For example, the fluid cooler 100 and the chiller 110 may be combined into one apparatus or the pump assembly 130 may be integrated into the cooling distribution unit 120.

In embodiments, the cooling system of FIGS. 1A-1D operates in one or more of the following modes of operation: full free cooling wet operation, full free cooling dry operation, partial free cooling wet operation, partial free cooling dry operation, full mechanical cooling wet operation, and full mechanical cooling dry operation. The control system for operating the cooling system according to one or more of these modes may switch between modes based on various measurements including the ambient wet bulb temperature and/or the ambient dry bulb temperature as measured, for example, by the temperature measurement device 135 illustrated in FIG. 1A.

In embodiments, the control system performs a cooling method which includes sensing a dry bulb temperature and a wet bulb temperature of the ambient air, and operating the fluid cooler 100 and the chiller 110 according to one of the following modes based on the sensed dry bulb temperature and sensed wet bulb temperature of the ambient air: a full free cooling dry operational mode in which a fluid circuit is cooled by ambient air; a full free cooling wet operational mode in which the fluid circuit is cooled by ambient air that has been cooled by wet media, e.g., wet media 102a, 102b; a partial free cooling dry operational mode in which the fluid circuit is cooled by ambient air and by a refrigerant circuit; a partial free cooling dry operational mode in which the fluid circuit is cooled by a refrigerant circuit and by ambient air that has been cooled by the wet media; a full mechanical cooling dry operational mode in which the fluid circuit is cooled by the refrigerant circuit; and a full mechanical cooling wet operational mode in which the fluid circuit is cooled by the refrigerant circuit and a heat exchanger of the refrigerant circuit is cooled by ambient air that has been cooled by the wet media. In some embodiments, the cooling system may be configured to perform a portion of the operational modes.

In embodiments, the fluid cooler 100 is disposed outdoors and contains two individually-housed assemblies of an in-series array of wet media, e.g., wet media 102a, 102b, air to fluid heat exchangers, e.g., air to fluid heat exchangers 104a, 104b, such as micro-channel free cooling air to water heat exchangers, and air to refrigerant heat exchangers, e.g., air to refrigerant heat exchangers 106a, 106b, such as micro-channel direct expansion condensing coils. Each assembly may be individually connected to power, air, water, and refrigerant circuits.

As described in more detail below, in embodiments, the cooling system includes a modular hybrid cooler/chiller assembly that has a compatible dual piping system including pipe cage modules that connects the fluid coolers and chillers as an array.

In embodiments, the chiller 100 uses its free cooling coils 106a, 106b in air series to provide a cool stable inlet air temperature to its condensing coil.

In embodiments of the modular cooling system, multiple fluid cooler/chiller units, e.g., four fluid cooler/chiller units, are initially installed. In embodiments, each fluid cooler/chiller unit includes the fluid cooler of FIG. 1A and the chiller of FIG. 1B. The control system may be programmed for two pump houses. Each pump house 210 may contain three chilled water pumps 182a-182c, one of which is redundant. One pump house may be initially installed until there is a need or demand for more pump houses. The modular cooling system may include two pipe feeds for redundancy. During normal operation, both pipe feeds may be utilized. The chilled water pumps 182a-182c circulate chilled water to one or more CDUs (also referred to as a pumped refrigeration unit), e.g., the CDU 120 depicted in FIG. 1C. One or more CDUs may be disposed indoors within a facility or building. The CDU 120 circulates refrigerant between its internal refrigerant-to-water heat exchanger and the edge device, which may include, for example, the evaporators 127a, 127b and fans 134a, 134b shown in FIG. 1C, which is close-coupled to the heat load.

Figure 2:
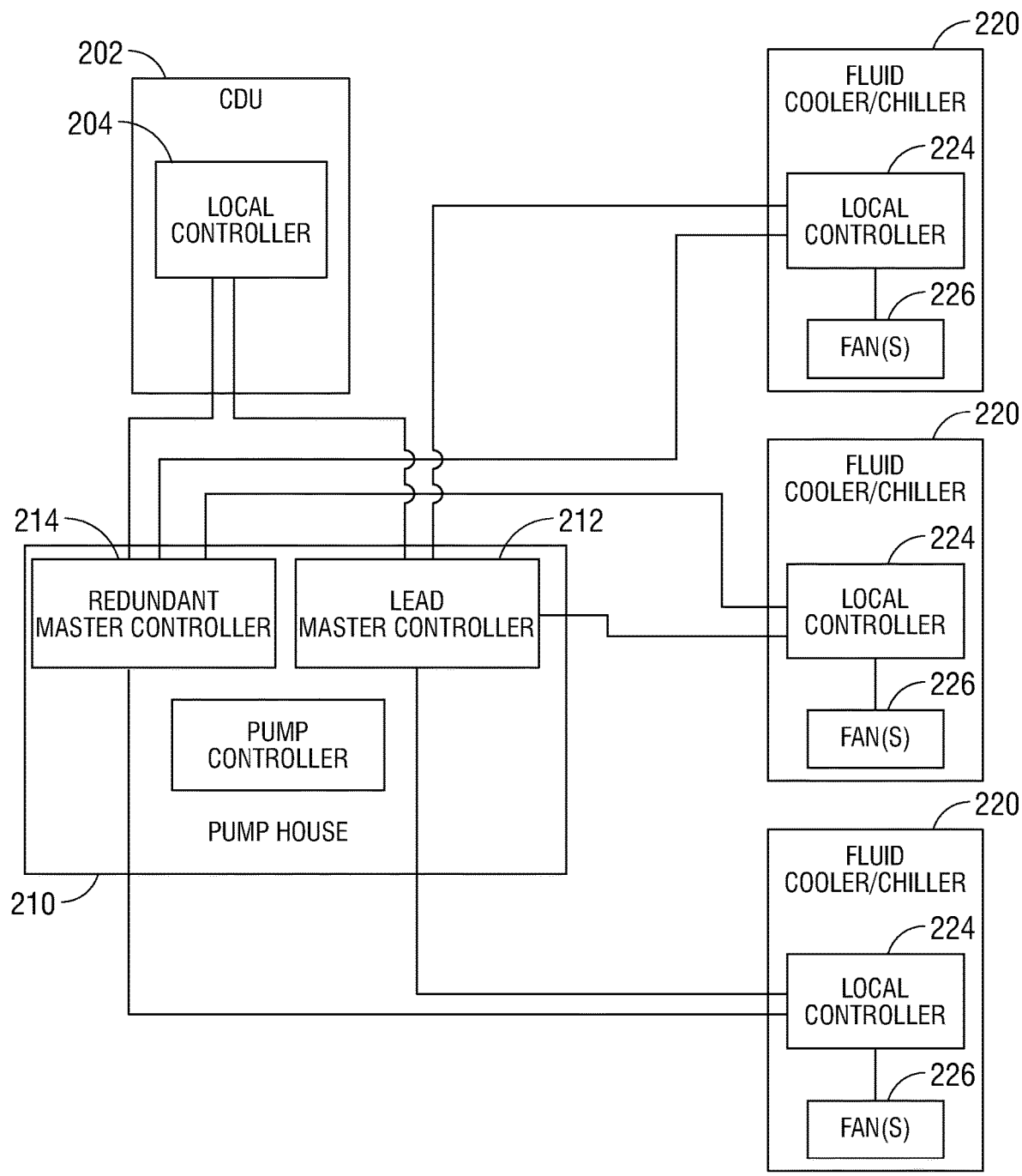
FIG. 2 is a block diagram of a cooling system including a control system architecture according to embodiments of the present disclosure.

FIG. 2 is a block diagram of a cooling system according to embodiments of the present disclosure. The control system may include two master controllers—a lead master controller 212 and a redundant master controller 214—located, for example, in the pump house 210. Each fluid cooler/chiller unit 220 may include a local controller 224, such as a programmable logic controller (PLC). The local controllers 224 are operably coupled to respective fans 226 via respective variable frequency drives (VFDs) (not shown). The local controllers 224 control the VFDs to modulate the speed of the fans 226. The master controllers 212, 214 communicate with the local controllers 224 via a network such as an Ethernet network. Each CDU 202 includes a local controller 204, such as a PLC, which communicates with the master controllers 212, 214 via Modbus communication protocol.

The master controllers 212, 214 and the local controllers 224 may include at least one special-purpose or general purpose processor that, during normal operation, processes data under the control of software, which may include at least one of application software, an operating system, middleware, and other code and computer executable programs accessible from a dynamic storage device such as random access memory (RAM), a static storage device such as Read Only Memory (ROM), a data storage device, such as a mass storage device, or other data storage medium. The software may include, but is not limited to, code, applications, protocols, interfaces, and processes for controlling the fans 226 and other controllable features of the cooling systems of the present disclosure.

In embodiments, the fluid cooler/chiller units can operate in four modes: dry free cooling mode, wet free cooling mode, partial free cooling mode, and mechanical cooling mode. Normally, the master controller 212 enables and selects the operating mode of each fluid cooler/chiller unit. As described in more detail below, each fluid cooler can operate in a dry mode or a wet mode (also known as evaporative cooling mode). The master controller 212 selects either the dry mode or the wet mode for each fluid cooler.

The master controller 212 sets the speed setpoint for the fans 226 in all fluid cooler/chiller units 220 in free cooling mode to maintain a master chilled water supply (CWS) temperature setpoint. In embodiments, the master CWS temperature setpoint varies from a high temperature setpoint, e.g., 21.1° C., to a low temperature setpoint, e.g., 15.6° C., as the highest loaded CDU 202 varies from a low load, e.g., 10% of a 350 kW IT load, to a high load, e.g., 100% of a 350 kW IT load. When the CDU 202 fails, the CWS temperature setpoint goes to a CDU failure temperature setpoint, e.g., −12.2° C.

Each fluid cooler/chiller unit 220 may be operated in a lead, lag 1, lag 2, etc. priority. The lead fluid cooler/chiller unit 220 may be periodically rotated, e.g., weekly. For example, the lead fluid cooler/chiller unit 220 may be assigned the lowest priority, and every other fluid cooler/chiller unit may be incremented by one in priority.

If a fluid cooler/chiller unit 220 fails, the next available fluid cooler/chiller unit 220 may be enabled. If the compressor, e.g., the compressor 105 of FIG. 1B, is operating in a failed fluid cooler/chiller unit (in partial free cooling or mechanical cooling mode), the replacement fluid cooler/chiller unit 220 may operate in the same mode. When the failure is cleared and manually reset by the operator, the fluid cooler/chiller unit 220 regains its sequence in priority.

When an operator or user selects maintenance mode in a fluid cooler/chiller unit 220, the fluid cooler/chiller unit 220 is disabled. When the operator deselects maintenance mode, the fluid cooler/chiller unit 220 regains its sequence in priority.

As described above, the fluid cooler/chiller unit loading or staging includes a free cooling mode, a partial cooling mode, and a full mechanical cooling mode. In free cooling mode, all available fluid coolers operate to maintain the chilled water (CW) temperature setpoint. In partial or full mechanical cooling mode, the master controller selects the number of fluid coolers/chiller units to run based upon a calculated load, which may be in units of tons of refrigeration, minimum chilled water (CW) flow (liters per minute), and the number of fluid cooler/chiller units currently selected. Tonnage may be calculated based on the measured total load on the cooling system.

There may be at least two temperature sensors disposed in each pipe feed 136, 138 (rather than a single temperature sensor as illustrated by temperature sensors 137, 139 in FIG. 1B): one providing temperature measurements to the lead master controller 212 and the other providing temperature measurements to the redundant master controller 214. In the event of a failure of any temperature sensor, the value from the equivalent sensor mapped from the redundant master controller 214 is used. There may also be lead flow meters and redundant flow meters. Normally, the CW supply flow meter may be used. In the event of a failure of the CW supply flow meter, the flow measurements from the return flow meter are used.

Tons of refrigeration are also calculated using the flow measurements from Electronic Pressure Independent Control Valves (ePIV) at each fluid cooler/chiller unit and the temperature measurements from the return temperature sensor 137 and the supply temperature sensor 139 at each fluid cooler/chiller unit. The sum of the fluid cooler/chillers tonnage may be displayed on a screen, which is presented by a control system management software application running on a computer system, next to the calculated load in tonnage and a warning may indicate a deviation of more than a predetermined deviation amount, e.g., 10%, for a predetermined time, e.g., 5 minutes, which may be adjustable. The fluid cooler/chiller units that are off, failed, or in maintenance mode may not figure into the load calculation.

Figure 3:
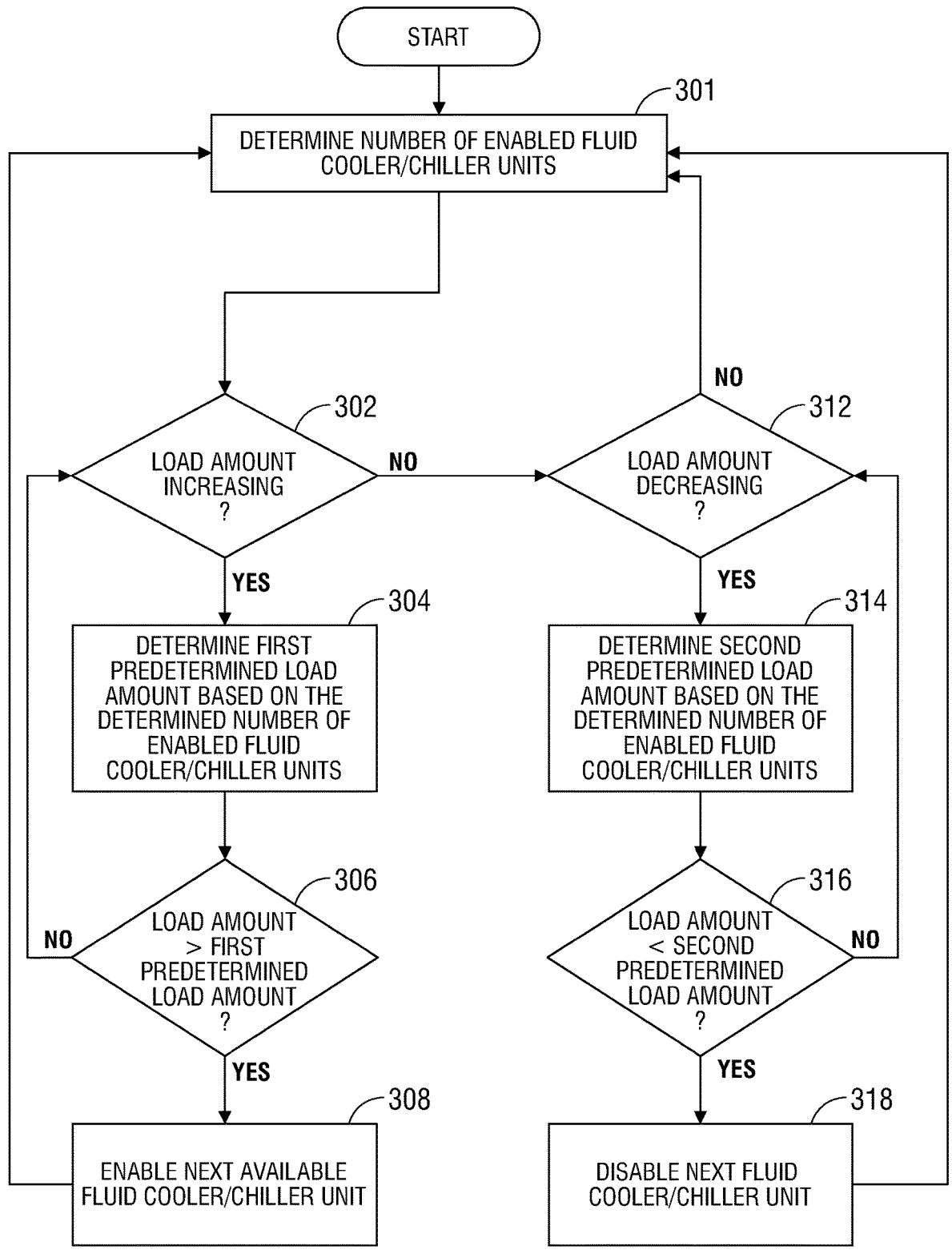
FIG. 3 is a flow diagram illustrating a method of enabling and disabling fluid cooler/chiller units according to embodiments of the present disclosure.

In embodiments, the number of fluid coolers/chiller units that are enabled depends on the calculated load amount. FIG. 3 is a flow diagram illustrating a method or process of enabling and disabling fluid cooler/chiller units according to embodiments of the present disclosure.

In step 301 of the method, the number of enabled fluid cooler/chiller units is determined. In step 302 it is determined whether the load amount is increasing. If the load amount is increasing, the first predetermined load amount is determined in step 304 based on the number of enabled fluid cooler/chiller units determined in step 301. First predetermined load amounts and corresponding numbers of enabled fluid cooler/chiller units may be stored in a lookup table or other similar table stored in memory, e.g., memory residing in the master controller, which may be implemented as a microprocessor. Next, in step 306, it is determined whether the calculated load amount is greater than the first predetermined load amount. If the calculated load amount is greater than the first predetermined load amount, the next available fluid cooler/chiller unit is enabled in step 308.

If, in step 302, it is determined that the load amount is not increasing, it is determined whether the load amount is decreasing in step 312. If the load amount is decreasing, the second predetermined load amount is determined in step 314 based on the number of enabled fluid cooler/chiller units determined in step 301. Second predetermined load amounts and corresponding numbers of enabled fluid cooler/chiller units may be stored in the same lookup table described above or in another lookup table stored in memory, e.g., memory residing in the master controller. Next, in step 316, it is determined whether the calculated load amount is greater than the first predetermined load amount. If the load amount is less than the second predetermined load amount, the next fluid cooler/chiller unit is disabled in step 318. The predetermined load amounts may be in units of tons. The predetermined load amounts may alternatively be a percentage of load amounts. In embodiments, the number of fluid cooler/chiller units that are enabled or disabled is limited to a single fluid cooler/chiller unit in a predetermined period, e.g., 15 minutes. This may be configurable, but may not be user or operator adjustable.

In an exemplary embodiment, the number of enabled fluid cooler/chiller units and corresponding first and second predetermined load amounts are illustrated in the following table. This data may be stored in a lookup table or other similar table stored in memory, e.g., memory residing in the master controller or a system controller.

| Number of Fluid Cooler/ Chiller Units Enabled | When load is increasing, enable next unit when Load goes above this amount (tons) | When load is increasing, enable next unit when Load goes above this amount (%) | When load is decreasing, disable next unit when Load goes below this amount (tons) | When load is decreasing, disable next unit when Load goes below this amount (%) | Maximum Load (tons) |
|---|---|---|---|---|---|
| 1 | 120 | 85% | 110 | 77% | 140 |
| 2 | 180 | 63% | 165 | 58% | 280 |
| 3 | 240 | 56% | 220 | 52% | 420 |
| 4 | 300 | 53% | 275 | 48% | 560 |
| 5 | 360 | 51% | 330 | 46% | 700 |
| 6 | 420 | 49% | 385 | 45% | 840 |
| 7 | 480 | 48% | 440 | 44% | 980 |
| 8 | 540 | 48% | 495 | 44% | 1120 |
| 9 | 600 | 47% | 550 | 43% | 1260 |
| 10 | 660 | 46% | 605 | 43% | 1400 |
| 11 | 720 | 46% | 660 | 42% | 1540 |
| 12 | 780 | 46% | 715 | 42% | 1680 |
| 13 | 840 | 46% | 770 | 42% | 1820 |
| 14 | 900 | 45% | 825 | 41% | 1960 |
| 15 | 960 | 45% | 880 | 41% | 2100 |

-continued

| Number of Fluid Cooler/ Chiller Units Enabled | When load is increasing, enable next unit when Load goes above this amount (tons) | When load is increasing, enable next unit when Load goes above this amount (%) | When load is decreasing, disable next unit when Load goes below this amount (tons) | When load is decreasing, disable next unit when Load goes below this amount (%) | Maximum Load (tons) |
|---|---|---|---|---|---|
| 16 | 1020 | 45% | 935 | 41% | 2240 |
| 17 | 1080 | 45% | 990 | 41% | 2380 |
| 18 | 1140 | 45% | 1045 | 41% | 2520 |
| 19 | 1200 | 44% | 1100 | 41% | 2660 |
| 20 | 1260 | 44% | 1155 | 41% | 2800 |
| 21 | 1320 | 44% | 1210 | 41% | 2940 |
| 22 | 1380 | 44% | 1265 | 40% | 3080 |
| 23 | 1440 | 44% | 1320 | 40% | 3220 |
| 24 | 1500 | 44% | 1375 | 40% | 3360 |

According to this exemplary table, fluid cooler/chiller units are enabled or disabled based on whether the load goes above or below the indicated predetermined load amount. For example, if 10 fluid cooler/chiller units are enabled and if the load is increasing, the next available fluid cooler/chiller unit is enabled when the load amount goes above 660 tons or 46% of maximum load. On the other hand, if 10 fluid cooler/chiller units are enabled and if the load is decreasing, the next fluid cooler/chiller unit is disabled when the load amount goes below 605 tons or 43% of maximum load.

In embodiments, the master controller determines the operating mode of each fluid cooler/chiller unit. The operating mode is based on the ambient temperature. When a fluid cooler/chiller unit is operating in the free cooling mode, the master controller controls the speed of the fluid cooler fans, e.g., fans 132a, 132b. When the chiller compressor, e.g., the compressor 105, is running (e.g., in pre-cooling mode or in mechanical cooling mode), the master controller passes control of the speed of the fluid cooler fans to the local controller, which modulates the fluid cooler fan speed to maintain compressor discharge pressure.

Figure 4A:
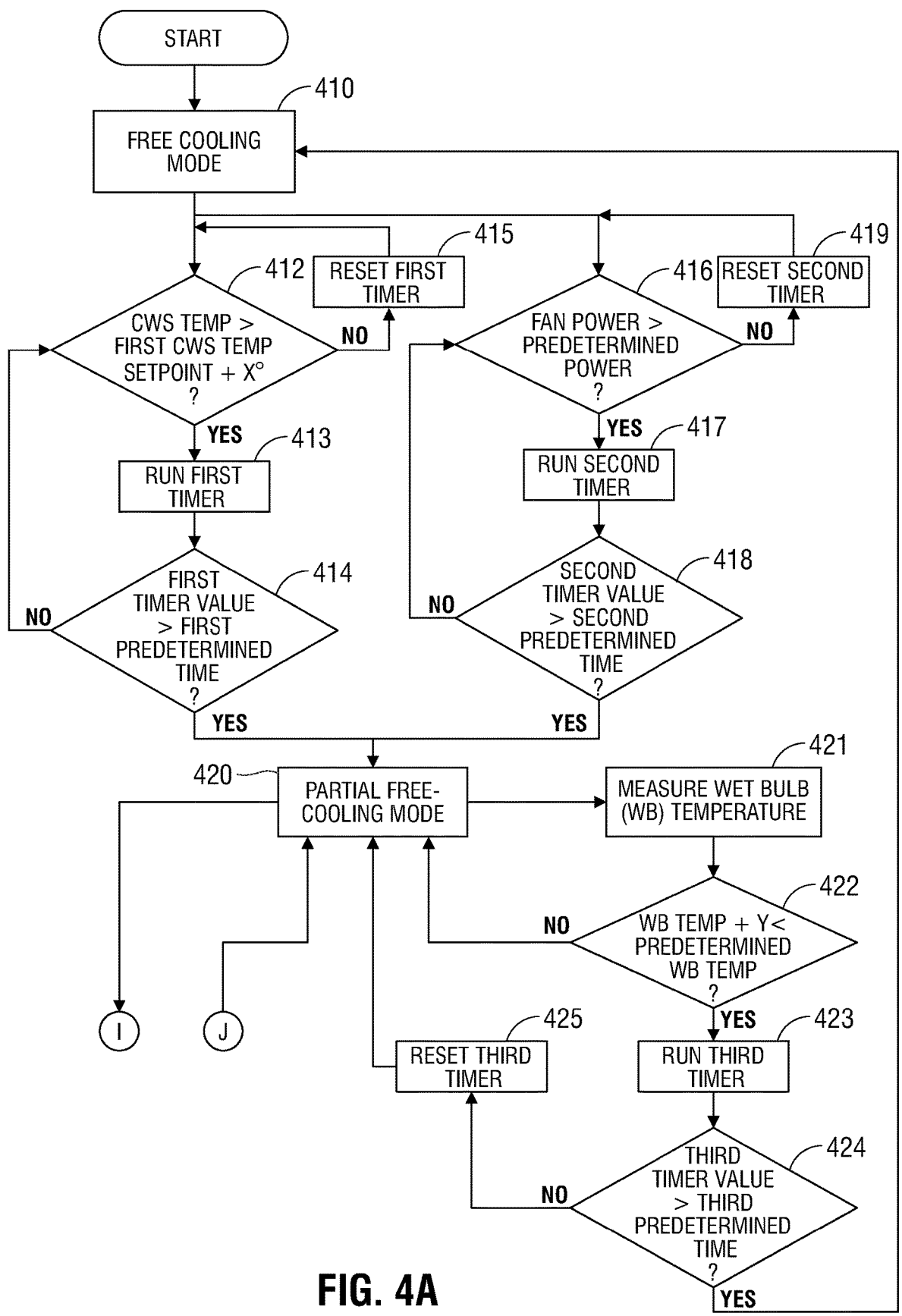
FIGS. 4A and 4B are flow diagrams illustrating a method of controlling the cooling system according to embodiments of the present disclosure.
Figure 4B:
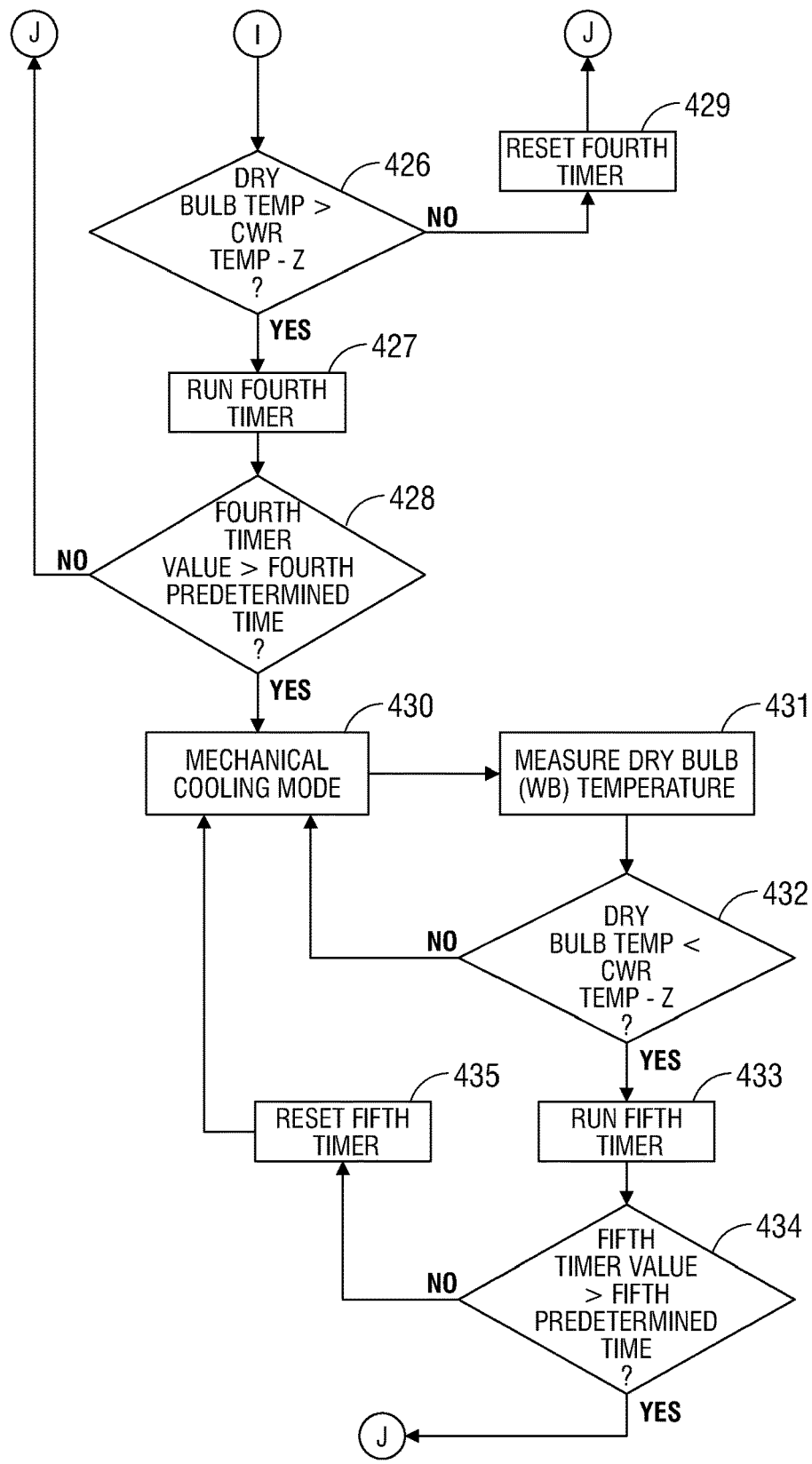
Figure 5:
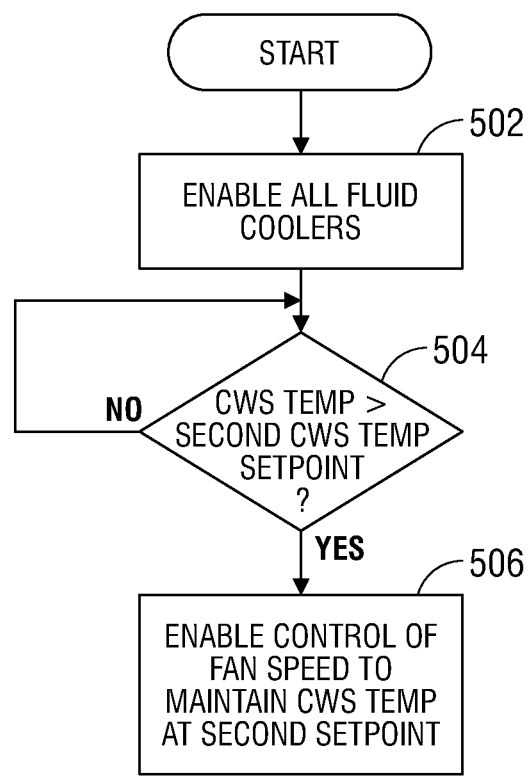
FIG. 5 is a flow diagram illustrating a free cooling mode according to embodiments of the present disclosure.

FIGS. 4A and 4B are flow diagrams illustrating a method of controlling the cooling system according to embodiments of the present disclosure. In embodiments, the demand for cooling capacity determines the number of fluid cooler/chiller systems to start. For example, if 500 kW of cooling is required, two fluid cooler/chiller units, each having a cooling capacity of 500 kW may be started at half capacity. Then, as the demand increases, additional fluid cooler/chiller systems are incrementally enabled. Or, as the demand decreases, enabled fluid cooler/chiller systems are incrementally disabled. As shown in FIG. 4A, the control process starts in the free cooling mode in step 410. FIG. 5 is a flow diagram illustrating a free cooling mode according to embodiments of the present disclosure. In the free cooling mode, all available fluid cooler units are enabled in step 502.

If it is determined that the cooling water supply (CWS) average leaving temperature for all fluid cooler units, which may be weighted for flowrate, is greater than a second CWS temperature setpoint in step 504, control of the fan speed is enabled (using, for example, a PID control algorithm) in step 506. The fan speed of all enabled fluid cooler units is modulated to maintain the CWS temperature at the second CWS temperature setpoint.

Referring again FIG. 4A, in steps 416-418, it is determined whether the fan power is greater than a predetermined power, e.g., 0.5 kW/ton, for a first predetermined period, e.g., 10 minutes, or, in step 412-414, it is determined whether the CWS temperature is greater than a predetermined temperature setpoint plus a predetermined number of degrees, e.g., 2 degrees, for a second predetermined period, e.g., 5 minutes, in order to determine whether to transition the cooling system from operating in the free cooling mode to operating in the partial free cooling mode.

Specifically, if it is determined in step 412 that the measured CWS temperature is greater than the CWS temperature setpoint plus X degrees, a first timer or a first clock, which is initially reset to zero, is run in step 413 and it is determined whether the first timer or first clock value is greater than a first predetermined time in step 414. If the first timer value is greater than the first predetermined time, the cooling system transitions to the partial free cooling mode in step 420. If the first timer value is not greater than the first predetermined time in step 414, the process returns to step 412. If, in step 412, it is determined that the measured CWS temperature is not greater than the CWS temperature setpoint plus X degrees, the first timer is reset in step 415.

Also, after entering the free cooling mode in step 410, if it is determined in step 416 that the fan power is greater than a predetermined power, a second timer or second clock is run in step 417 and it is determined whether the second timer or second clock value is greater than the second predetermined time in step 418. If the second timer or second clock value is greater than the second predetermined time, the cooling system transitions to the partial free cooling mode in step 420. If the second timer value is not greater than the second predetermined time in step 418, the process returns to step 416. If, in step 416, it is determined that the fan power is greater than a predetermined power, the second timer is reset in step 419. In another embodiment, steps 412-415 are performed, but steps 416-419 are not performed. In yet another embodiment, steps 416-419 are performed, but steps 412-415 are not performed.

When the cooling mode is changed from the free cooling mode to the partial free cooling mode, the wet bulb (WB) temperature is measured in step 421 and recorded. When the measured wet bulb temperature plus a predetermined number of degrees, e.g., 1.65° C., is less than the recorded wet bulb temperature for a predetermined period, e.g., 10 minutes, the cooling system transitions from the partial free cooling mode to the free cooling mode. Specifically, if it is determined in step 422 that the measured WB temperature plus Y degrees is less than the predetermined WB temperature setpoint, a third timer or a third clock, which is initially reset to zero, is run in step 423 and it is determined whether the third timer or third clock value is greater than the third predetermined time in step 424. If the third timer value is greater than the third predetermined time, the cooling system transitions from the partial free cooling mode in step 420 to the free cooling mode in step 410. If the third timer value is not greater than the third predetermined time in step 424, the process returns to step 420 and another measurement of the WB temperature is taken in step 421. If, in step 422, it is determined that the measured WB temperature plus Y degrees is not less than the predetermined WB temperature setpoint, the third timer is reset in step 425.

Figure 6:
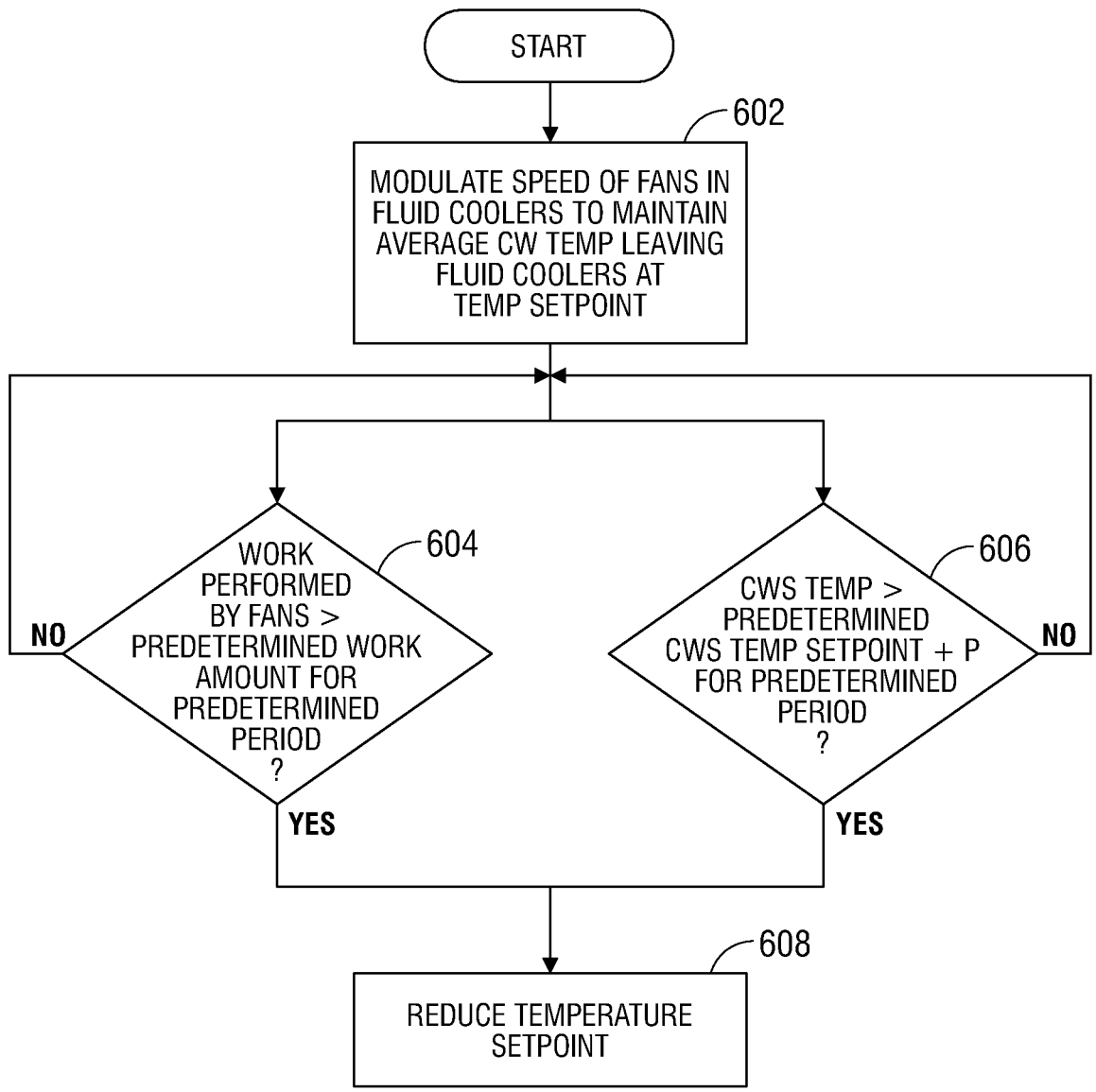
FIG. 6 is a flow diagram illustrating a partial free cooling mode according to embodiments of the present disclosure.

FIG. 6 is a flow diagram illustrating a partial free cooling mode according to embodiments of the present disclosure. In partial free cooling mode, the fluid cooler fan speed is modulated to maintain the average CW temperature leaving the fluid cooler, e.g., fluid cooler 100, at a predetermined temperature setpoint in step 602 as the first stage. For example, the temperature of the cooling water leaving the fluid cooler 100 is measured by the temperature sensor 117 and compared to the predetermined temperature setpoint. If the measured temperature is greater than the predetermined temperature setpoint, the speed of the fluid cooler fans 132*a*, 132*b* is increased.

On the other hand, if the measured temperature is less than the predetermined temperature setpoint, the speed of the fluid cooler fans 132*a*, 132*b* is decreased. If, in step 604, the fluid cooler fans 132*a*, 132*b* are running at greater than a predetermined amount, e.g., 0.5 kW/ton for more than a predetermined period, e.g., 5 minutes, a second stage is started in step 608 where the cooling water temperature setpoint of the fluid coolers/chiller units in the partial free cooling mode is reduced, e.g., the cooling water temperature setpoint is adjusted by a predetermined rate, e.g., −0.5 degrees per minute, to give a blended cooling water temperature setpoint. In other words, if the fluid cooler fans 132*a*, 132*b* are operating at maximum capacity, additional cooling capacity is obtained by reducing the cooling water temperature setpoint. If, however, the fluid cooler fans 132*a*, 132*b* return to operating at less than maximum capacity and the cooling water flow rate is at a minimum, the cooling water temperature setpoint may be increased.

Or if in step 606 the CW supply temperature is greater than the CW supply temperature setpoint plus a predetermined number of degrees, e.g., −16.7° C., for more than a predetermined period, e.g., 5 minutes, the second stage is started in step 608 where the cooling water temperature setpoint or the compressor temperature setpoint of the fluid cooler/chiller units in the partial free cooling mode is reduced, e.g., the cooling water temperature setpoint is adjusted by a predetermined rate, e.g., 0.5 degrees per minute, to give a blended chilled water temperature setpoint. After reducing the cooling water temperature setpoint in step 608, the process returns to step 602. The process of FIG. 6 continues until the partial free cooling mode is exited.

After entering the partial free cooling mode in step 420, the master controller transitions all fluid cooler/chiller units to full mechanical cooling mode when the dry bulb temperature of the air coming off the wet media is greater than the return water temperature minus a predetermined number of degrees, e.g., −16.7° C. for a predetermined period, e.g., 5 minutes. For example, as shown in FIG. 4B, it is determined in step 426 whether the dry bulb temperature is greater than the return water temperature minus Z degrees. If it is determined in step 426 that the dry bulb temperature is greater than the return water temperature minus Z degrees, a fourth timer, which is initially reset to zero, is run in step 427 and it is determined whether the fourth timer value is greater than a fourth predetermined time in step 428. If the fourth timer value is greater than the first predetermined time, the cooling system transitions to the mechanical cooling mode in step 430. If the fourth timer value is not greater than the fourth predetermined time in step 428, the process returns to step 420. If, in step 426, it is determined that the dry bulb temperature is not greater than the return water temperature minus Z degrees, the fourth timer is reset in step 429 and the process returns to step 420. In full mechanical cooling mode, the compressor setpoint is the CW temperature setpoint.

The master controller transitions the fluid cooler/chiller units from full mechanical cooling mode to partial free cooling mode when the air dry bulb temperature coming off the wet media is less than the return water temperature minus a predetermined number of degrees, e.g., −16.7° C., for a predetermined period, e.g., 5 minutes. For example, as shown in FIG. 4B, the dry bulb temperature is measured in step 431, then, it is determined in step 432 whether the dry bulb temperature is less than the return water temperature minus Z degrees. If it is determined in step 432 that the dry bulb temperature is less than the return water temperature minus Z degrees, a fifth timer, which is initially reset to zero, is run in step 433 and it is determined whether the fifth timer value is greater than a fifth predetermined time in step 434. If the fifth timer value is greater than the fifth predetermined time, the cooling system transitions to the partial free cooling mode in step 420. If the fifth timer value is not greater than the fifth predetermined time in step 434, the process returns to step 430. If, in step 432, it is determined that the dry bulb temperature is not less than the return water temperature minus Z degrees, the fifth timer is reset in step 435 and the process returns to step 430.

The control systems and methods of the present disclosure also include an anti-biological drying cycle. The master controller monitors and records wet and dry run times for each fluid cooler/chiller unit. When a fluid cooler/chiller unit runs dry for a predetermined period, e.g., one hour, the clock is reset to zero. When a fluid cooler/chiller unit runs wet for another predetermined period, e.g., a 24-hour period, that fluid cooler/chiller unit is placed in an anti-biological drying cycle and is placed in maintenance mode for a predetermined period, e.g., one hour and taken out of the lead-lag rotation.

The building management system (BMS) notifies the operator that the fluid cooler of the fluid cooler/chiller unit is in the anti-biological drying cycle. In the anti-biological drying cycle, the evaporator recirculating pumps e.g., pumps 133*a*, 133*b* of FIG. 1A, are deactivated and the fluid cooler fan speed is set to a predetermined speed, e.g., 50%, which may be adjustable, and the fluid cooler/chiller unit is run in this manner for a predetermined period, e.g., 50 minutes. After the predetermined period, the fan speed is set to zero and the evaporative recirculating pumps, e.g., pumps 133*a*, 133*b* of FIG. 1A, are started to wet the adiabatic wet media prior to putting the fluid cooler/chiller unit back in service. Thereafter, the fluid cooler/chiller unit is designated as active again and the fluid cooler/chiller unit runs under normal control. In embodiments, only one fluid cooler/chiller unit is in the drying cycle at a time.

In embodiments, the anti-biological drying cycle is not run unless the available number of fluid cooler/chiller units is greater than or equal to the number of fluid cooler/chiller required to handle the load plus one other fluid cooler/chiller unit. In other words, if another fluid cooler/chiller unit is available (that is, in working condition and not already used to handle the load), then the master controller runs the available fluid cooler/chiller unit and runs the anti-biological cycle on the fluid cooler/chiller unit requiring maintenance.

Otherwise, the anti-biological cycle is not run until the required number of fluid cooler/chiller units are available.

If a fluid cooler/chiller unit is required to start and if the ambient dry bulb temperature is greater than a predetermined temperature, e.g., 26.7° C., the wet media is maintained in a wet or damp state to facilitate immediate cooling effect. Thereafter, for the first portion of a predetermined cycle period, e.g., 10 minutes, or another portion of the predetermined cycle period, e.g., each hour, the evaporative recirculation pumps 133a, 133b are run with the fans 132a, 132b turned off to saturate the wet media.

Each fluid cooler 100 may include a control system, e.g., a NALCO control system, which operates the bleed solenoid valve 109 in blowdown cycles to maintain water conductivity. If the measured conductivity is greater than a predetermined conductivity, e.g., if the conductivity is greater than 2250 micro Siemens per cm, the make-up solenoid valve 107 is locked closed, the bleed solenoid valve 109 is opened, and the fluid cooler/chiller unit is operated. When the low level alarm is reached, the bleed solenoid valve 109 is closed and the make-up solenoid valve 107 is opened to fill the water reservoir or basin 108 to normal capacity. After a predetermined period, e.g., 2 minutes, the blowdown cycle repeats. The fluid cooler/chiller unit remains in a blowdown cycle until the measured conductivity level is less than a predetermined conductivity level setpoint, e.g., 400 micro Siemens per cm, for a predetermined period, e.g., 5 minutes.

In embodiments, if the fluid cooler/chiller units experience a power failure, upon restoration of power, the master controller re-enables all fluid cooler/chiller units to the same operating mode as immediately before the power failure.

In embodiments, the master controller 212 periodically determines the maximum number of units that can run in partial mechanical mode or full mechanical mode. Based on the priority, the master controller 212 communicates to each local controller 224 of the fluid cooler/chiller units to determine whether or not it can run in partial mechanical mode or full mechanical mode in the event of communication failure between the master controller 212 and the local controller 224. In the event of communication failure, all fluid cooler/chiller units that were not running remain off or disabled. For all fluid cooler/chiller units that were running upon failure, if they are running in free cooling mode they will remain on. If a fluid cooler/chiller unit is designated to not run in mechanical mode, when the local controller 224 requires mechanical mode, the fluid cooler/chiller unit shuts down and remains off until communication is re-established. Fluid cooler/chiller units designated to run in the mechanical mode cycle through the four operational modes based on local control, ambient conditions, and the last communicated CW temperature setpoint.

When the ambient dry bulb temperature drops below a predetermined freeze protection temperature value, e.g., 2.2° C., freeze protection mode is enabled. In the freeze protection mode, the make-up solenoid valve 107 is locked closed, the drain solenoid valve 140 is locked open, and the water circulation pumps 133a, 133b are locked out. When the master controller enables wet mode operation, the freeze protection mode is disabled, and valve and pump control is returned to normal operation. In embodiments, each pump assembly 130, which may be disposed in a pump house or on a pump skid, includes three chilled water pumps: a lead chilled water pump 182a, a lag chilled water pump 182b, and a standby chilled water pump 182c. In embodiments, one pump house is deployed initially and then subsequent pump houses are deployed depending on the requirements of the heat load.

Figure 7:
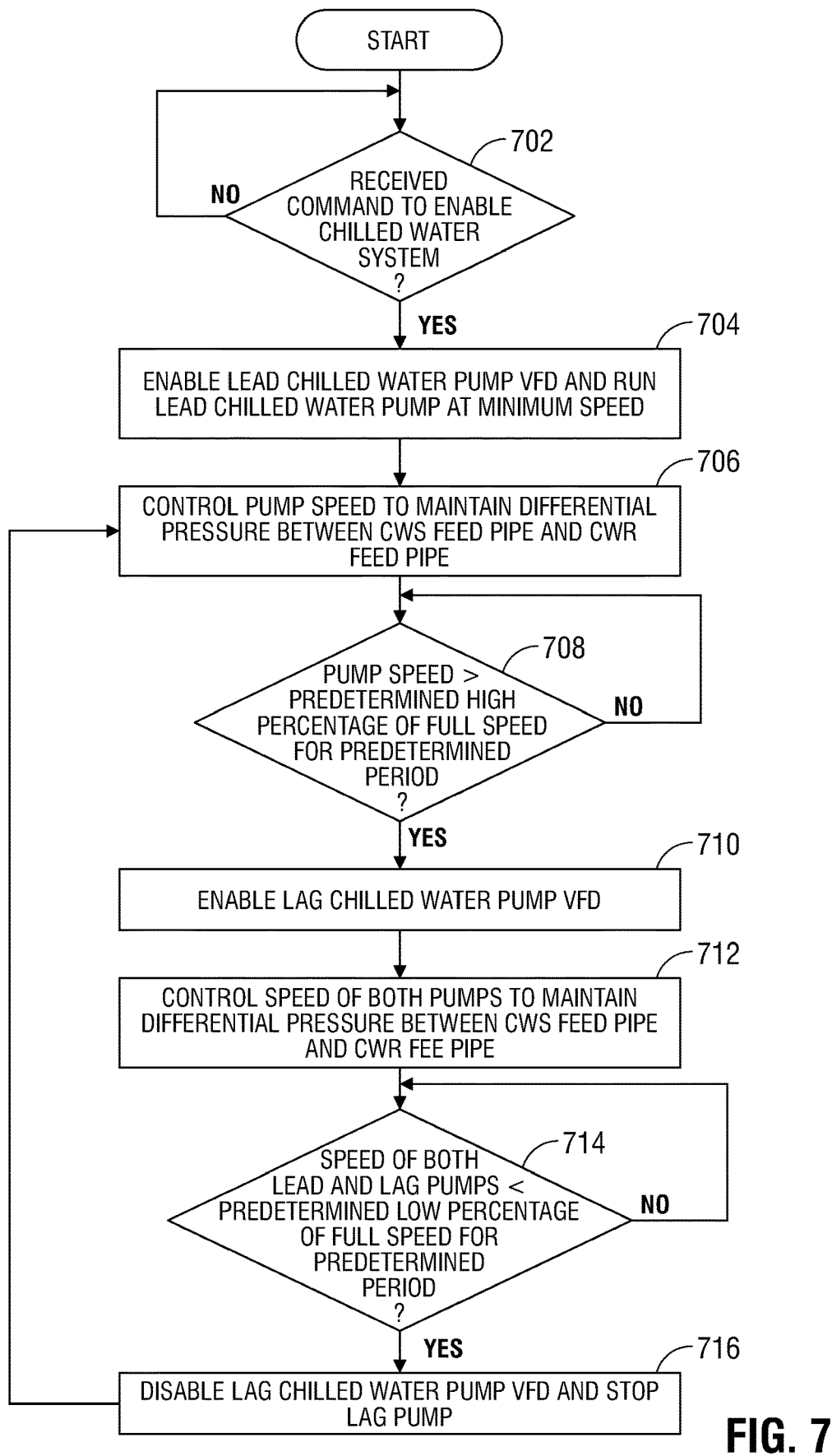
FIG. 7 is a flow diagram illustrating a method of controlling the chilled water pumps according to embodiments of the present disclosure.

FIG. 7 is a flow diagram illustrating a method of controlling the chilled water pumps according to embodiments of the present disclosure. Upon receiving a command to enable the chilled water system, e.g., by determining that the command has been received in step 702, the master controller enables the lead chilled water pump 184a using a variable frequency drive (VFD) and the lead chilled water pump 182a starts and runs at minimum speed, in step 704. The pump speed is controlled to maintain differential pressure between the chilled water supply feed pipe 138 and the chilled water return feed pipe 136 in step 706.

If in step 708 the speed of the lead chilled water pump 182a is determined to be greater than a predetermined percentage of full speed, e.g., 70-80%, for a predetermined period, e.g., 15 minutes, the master controller enables the lag chilled water pump 182b in step 710 and both the lead chilled water pump 182a and the lag chilled water pump 182b are operated at lower speeds that are the same or approximately the same to maintain a differential pressure between the chilled water supply feed pipe 138 and the chilled water return feed pipe 136 in step 712. The predetermined high percentage of full speed is set so that the lead chilled water pump 182a does not lose efficiency.

If it is determined in step 714 that both the lead chilled water pump 182a and the lag chilled water pump 182b are running at a speed below a predetermined low percentage of full speed, e.g., 35%, for the predetermined period, e.g., fifteen minutes, the lag chilled water pump VFD 184b is disabled in step 716 and the lag chilled water pump 182b stops.

In embodiments, when there are two pump houses, the pumps are designated lead pump, first lag pump, second lag pump, third lag pump, first standby pump, and second standby pump. Also, in embodiments where there are two pump houses, the staging alternates between pump houses to add pumps. In other words, the lead pump in the first pump house starts in a first stage, the first lag pump in the second pump house starts in a second stage, the second lag pump in the first pump house starts in a third stage, the third lag pump in the second pump house starts in a fourth stage, the first standby pump in the first pump house starts in a fifth stage, and the second standby pump in the second pump house starts in a sixth stage. In embodiments, if all pumps are operating at the same time, the VFDs control all respective pumps so they run at the same speed. When the chilled water system is disabled, the chilled water pump VFDs 184a-184c are de-energized and the pumps 182a-182c stop.

The building management system (BMS) monitors pump status via current sensing relays (not shown). Any time a pump status does not equal the pump command for a predetermined period, e.g., 5 seconds, except immediately after start-up, a pump failure alarm is displayed at the BMS, the pump is commanded off, and the lag pump is enabled.

In embodiments, the lead pump is the pump with the lowest number of run hours. The standby pump is the pump with the highest number of run hours. The lead, lag, and standby pumps are rotated automatically by the BMS on a predetermined schedule, e.g., a weekly schedule. The replacement pump starts before an operating pump is turned off. The pump priority may be overridden at the BMS.

Figure 8:
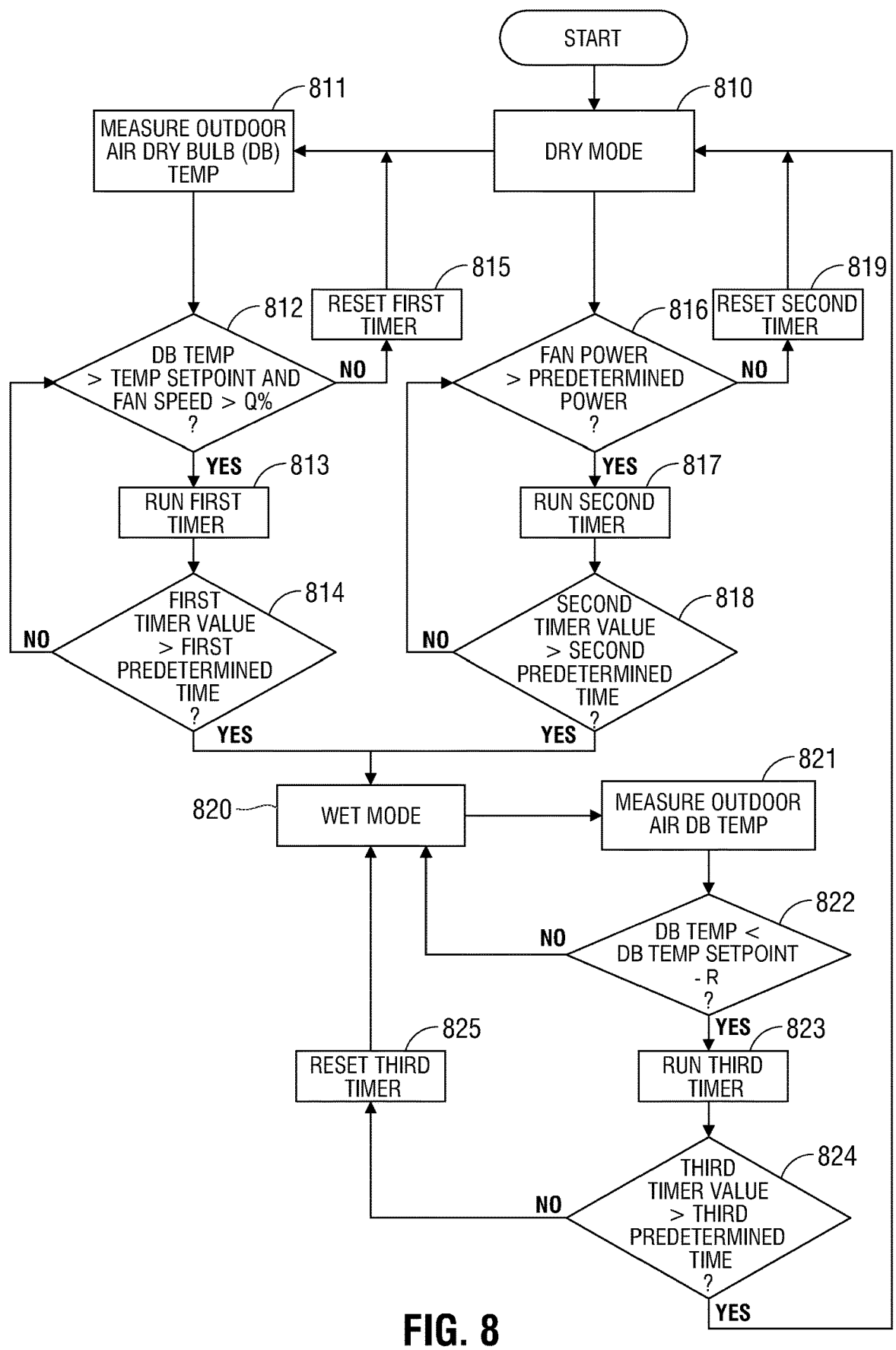
FIG. 8 is a flow diagram illustrating a method of operating a fluid cooler in a fluid cooler/chiller unit according to embodiments of the present disclosure.

FIG. 8 is a flow diagram illustrating a method of switching a fluid cooler in a fluid cooler/chiller unit between a wet mode and a dry mode. In embodiments, this method is independent of the operating mode, e.g., free cooling mode. Wet media, such as evaporative pads, may be disposed on each fluid cooler and may cool air entering the fluid cooler to within 0.56° C. of the wet bulb temperature. The selection of the wet mode versus the dry mode may be made by the master controller 212.

After starting, the fluid cooler is operated in the dry mode in step 810. In step 811, the outdoor air dry bulb (DB) temperature is measured. In step 812, it is determined whether the measured DB temperature is greater than a DB temperature setpoint, e.g., 7.2° C., and whether the fan speed is greater than a predetermined percentage R % of full speed, e.g., 40%.

If it is determined that the measured DB temperature is greater than the DB temperature setpoint and the fan speed is greater than a predetermined percentage R %, a first timer, which is initially reset to zero, is run in step 813 and it is determined whether the first timer value is greater than a first predetermined time, e.g., ten minutes, in step 814. If the first timer value is greater than the first predetermined time, the master controller switches the fluid cooler from the dry mode to the wet mode in step 820. In other embodiments, the controller may alternatively determine either whether the measured DB temperature is greater than a DB temperature setpoint or whether the fan speed is greater than a predetermined percentage R % of full speed, and transition the fluid cooler/chiller unit from the dry mode to the wet mode if either of those conditions are satisfied.

In the wet mode, the evaporative system for all or a portion of operational fluid coolers 100 are enabled. In the wet mode, the sump pumps 133a, 133b are turned on to spray water over the wet media 102a, 102b. The wet media 102a, 102b may be cellulose-based wet media. If the first timer value is not greater than the first predetermined time in step 814, the process returns to step 812. If, in step 812, it is determined that the measured DB temperature is not greater than a temperature setpoint and/or the fan speed is not greater than a predetermined percentage R %, the first timer is reset in step 815.

Also, when operating in the dry mode in step 810, if it is determined in step 816 that the fan power is greater than a predetermined power, e.g., 0.3 kW/ton, a second timer is run in step 817 and it is determined whether the second timer value is greater than the second predetermined time, e.g., ten minutes, in step 818. If the second timer value is greater than the second predetermined time, the control system switches the fluid cooler from the dry mode to the wet mode in step 820. If the second timer value is not greater than the second predetermined time in step 818, the process returns to step 816. If, in step 816, it is determined that the fan power is not greater than a predetermined power, the second timer is reset in step 819. In another embodiment, steps 811-815 are performed, but steps 816-819 are not performed. In yet another embodiment, steps 816-819 are performed, but steps 811-815 are not performed, When operating in the wet mode, the outdoor air dry bulb temperature is measured in step 821, then, it is determined in step 822 whether the measured outdoor air dry bulb temperature is less than the dry bulb temperature setpoint minus R degrees, e.g., 1.1° C. If it is determined in step 822 that the measured outdoor air dry bulb temperature is less than the dry bulb temperature setpoint minus R degrees, a third timer, which is initially reset to zero, is run in step 823 and it is determined whether the third timer value is greater than a third predetermined time in step 824. If the third timer value is greater than the third predetermined time, the master controller 212 switches the fluid coolers from the wet mode to the dry mode and the evaporative systems are turned off in step 810. If the third timer value is not greater than the third predetermined time in step 824, the process returns to step 810. If, in step 822, it is determined that the measured dry bulb temperature is not less than the dry bulb temperature setpoint minus R degrees, the third timer is reset in step 825 and the process returns to step 820.

In embodiments, the cooling system includes various alarms. In general, if it is determined that the reading of a sensor is outside of a predetermined range, the fluid cooler/chiller unit "locks" all outputs at the value immediately preceding the determination that the sensor is outside of the predetermined range. If the bad signal persists after a time delay, the master controller or local controller annunciates the alarm, and the chiller goes through an orderly shutdown and the next fluid cooler/chiller unit in the priority sequence is activated. A variety of other alarms may be issued including trim chiller failure; fluid cooler failure; high CWS temperature; low CWS temperature; water leak; refrigerant leak, fluid cooler low water level; fluid cooler high water conductivity; chiller tonnage deviation warning (e.g., trim chiller total versus pipe total); pump failure for each pump; and VFD failure or fault for each VFD.

In embodiments, the BMS display may provide all or a portion of the following information: fluid cooler/chiller unit operating mode (e.g., free cooling mode, partial free cooling mode, mechanical cooling mode, biological/dryer cycle mode, maintenance mode, and failure mode); fluid cooler/chiller wet/dry mode; fluid cooler/chiller status; fluid cooler priority table; master CWS setpoint; common CWS temperature for each pipe feed; common CWR temperature for each pipe feed; CWS temperature for each fluid cooler/chiller unit; CWR temperature for each fluid cooler/chiller unit; CW flow for each flow meter; fluid cooler fan speed command for each fluid cooler/chiller unit; number of fluid cooler fans enabled for each fluid cooler/chiller unit; number of hours since last biological/dryer cycle of fluid coolers; trim chiller compressor status; tonnage for each pipe feed and total tonnage for all pipe feeds; number of fluid cooler/chiller units required; tonnage for each fluid cooler/chiller unit; lowest edge device discharge air temperature setpoint; trim chiller valve V-1 position (fluid cooler or bypass) for each chiller; fluid cooler water conductivity; fluid cooler make-up water flow; fluid cooler blowdown water flow; evaporator pump status for each pump; indoor CDU number with maximum heat load and measured heat load in tons; outside air dry bulb temperature; wet bulb temperature; percent relative humidity; pump speed command for each pump; pump speed feedback for each pump; pump status for each pump; pump start/stop command; and VFD integration graphic.

Figure 9:
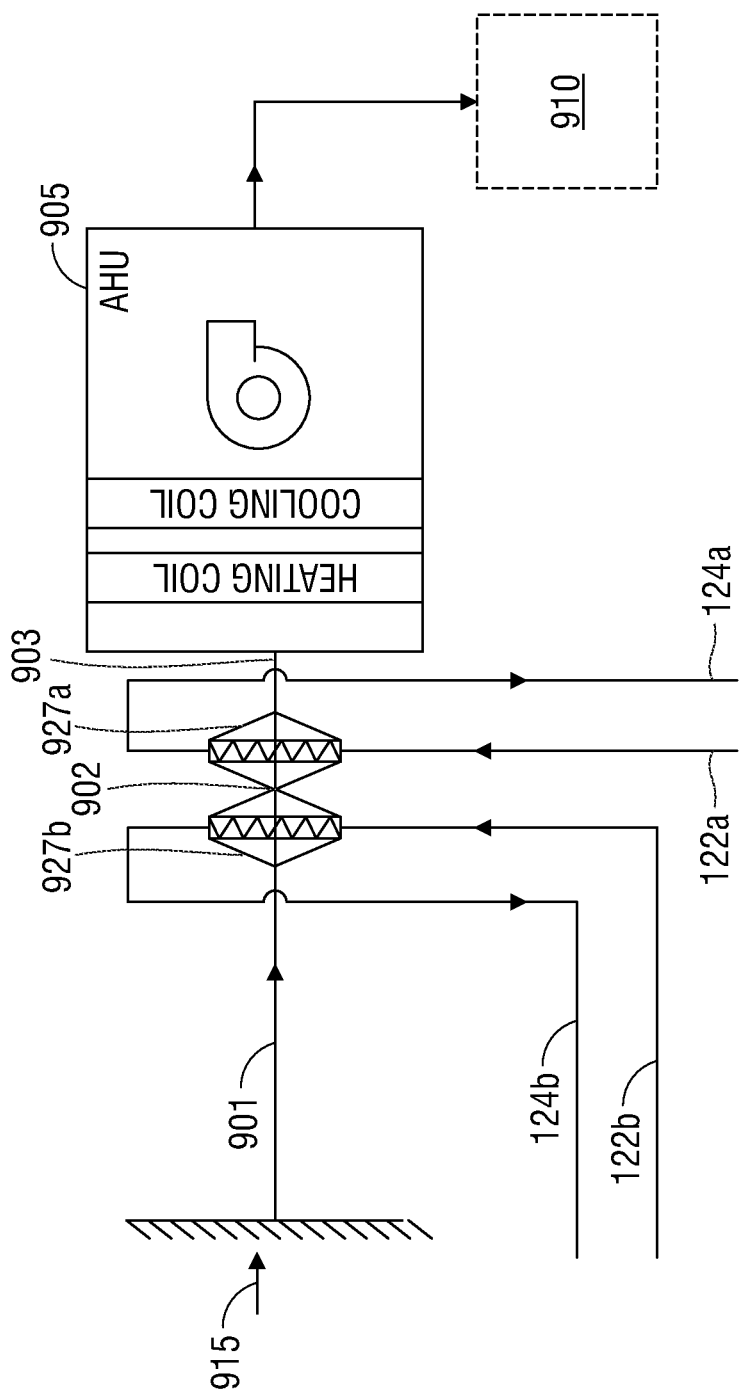
FIG. 9 is a block diagram illustrating a building air conditioning system that incorporates a cooling system according to embodiments of the present disclosure.

The cooling systems of the present disclosure may be applied in a variety of applications, including people cooling. FIG. 9 illustrates a dual pumped liquid refrigerant system according to embodiments of the present disclosure that includes a primary evaporator 927a and a secondary evaporator 927b in direct contact with cooling air flowing through a fresh air intake 901 to a heat load 910 that is downstream of an air handling unit (AHU) 905, which includes a heating coil and a cooling coil, which may form part of a building's air conditioning system. The building may include a hospital, a school, or other similar building that requires people cooling. The building may alternatively be a commercial building that requires cooling in industrial processes.

The flow of cooling air is directed to the air handling unit 905 from the fresh air intake 915 through cooling air conduits 901, 902, and 903. The first cooling air conduit 901 provides fluid communication between the fresh air intake 915 to the secondary evaporator 927b. Upon flowing through the secondary evaporator 927*b*, the cooling air is directed through second air flow conduit 902 to primary evaporator coil 927*a* to provide fluid communication between the primary and secondary evaporator coils 927*a* and 927*b*, respectively. Upon flowing through the primary evaporator coil 927*a*, the cooling air is directed through third air flow conduit 903 to provide fluid communication with the air handling unit 905 and the heat load 910.

The primary evaporator 927*a* is in fluid communication with the first liquid refrigerant pumped circuit 120*a* via liquid refrigerant supply header 122*a* and liquid refrigerant return header 124*a*. Similarly, the secondary evaporator coils 927*b* are in fluid communication with a second liquid refrigerant pumped circuit 120*b* via liquid refrigerant supply header 122*b* and liquid refrigerant return header 124*b*.

Via the fluid communication between the cooling air flowing through the air conduits 901, 902, and 903 from the fresh air intake 901, the primary and secondary evaporators 127*a* and 127*b*, and the primary and secondary liquid refrigerant pumped circuits 120*a* and 120*b* shown in FIG. 1C, the cooling air flowing through the air conduits 901, 902 and 903 from the fresh air intake 901 is thereby in thermal communication with the fluid cooler of FIG. 1A. The heat removal from the cooling air flowing through the air conduits 901, 902, and 903 is rejected to the environment via the fluid cooler of FIG. 1A.

Figure 10:
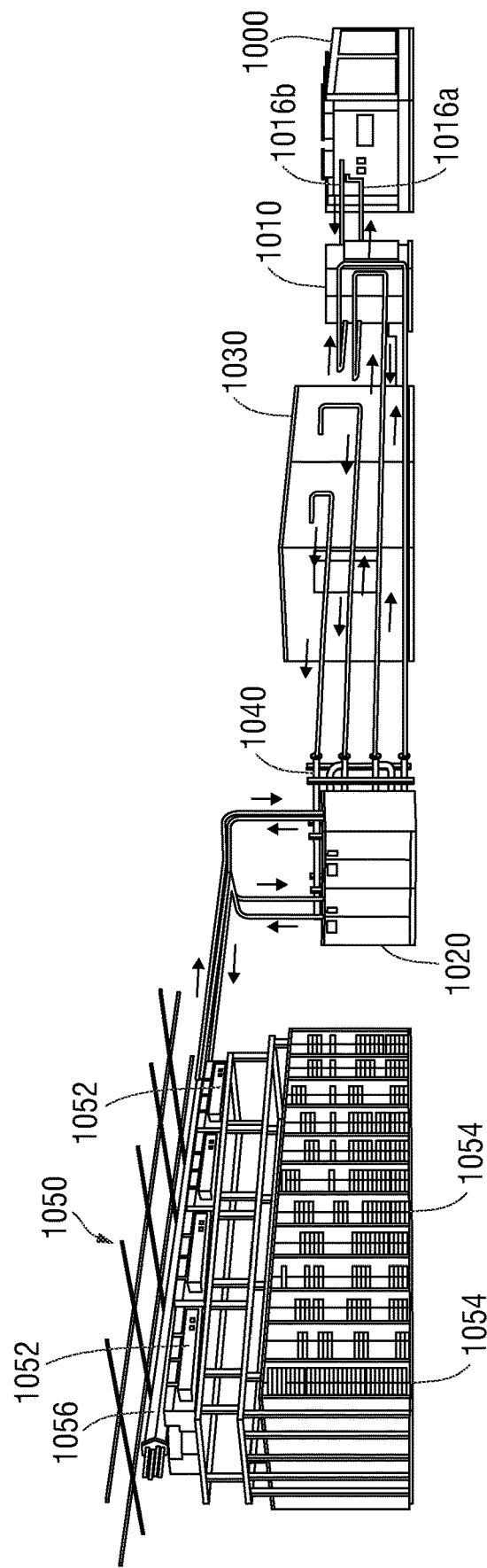
FIG. 10 is a perspective view of a cooling system according to an embodiment of the present disclosure.

FIG. 10 is a perspective view of a cooling system according to an embodiment of the present disclosure. The cooling system includes a fluid cooler 1000, a chiller 1010, a cooling distribution unit 1020, a pump room 1030, a pipe cage module 1040, and a server rack assembly 1050. The pump room 1030 includes multiple fluid pumps that pump cooled fluid, e.g., water or a water solution, from the fluid cooler 1000 and the chiller 1010 to the cooling distribution unit 1020 via the pipe cage module 1040. The fluid cooler 1000 is in fluid communication with the chiller 1010 via cooling fluid return line 1016*a* and cooling fluid supply line 1016*b*. The cooling distribution unit 1020 distributes refrigerant cooled by the cooled fluid to the evaporator cooling assemblies 1052 of the server rack assembly 1050. In this embodiment, the fluid cooler 1000 is separate from the chiller 1010 so that either the fluid cooler 1000 or the chiller 1010 may be replaced if needed. In other embodiments, the fluid cooler 1000 and the chiller 1010 are integrated into a single unit.

The server rack assembly 1050 includes the evaporator cooling assemblies 1052, server racks 1054 forming a hot aisle, and a raceway 1056 for power lines and piping. The evaporator cooling assembly 1052 includes fans (not shown), e.g., the fans 134*a*, 134*b* of FIG. 1C, which draw air from the hot aisle. The evaporator cooling assembly 1054 also includes evaporator coils (not shown), e.g., the evaporators 127*a*, 127*b* of FIG. 1C, which remove heat from the air drawn from the hot aisle by fans of the evaporator cooling assembly 1054.

Figure 11:
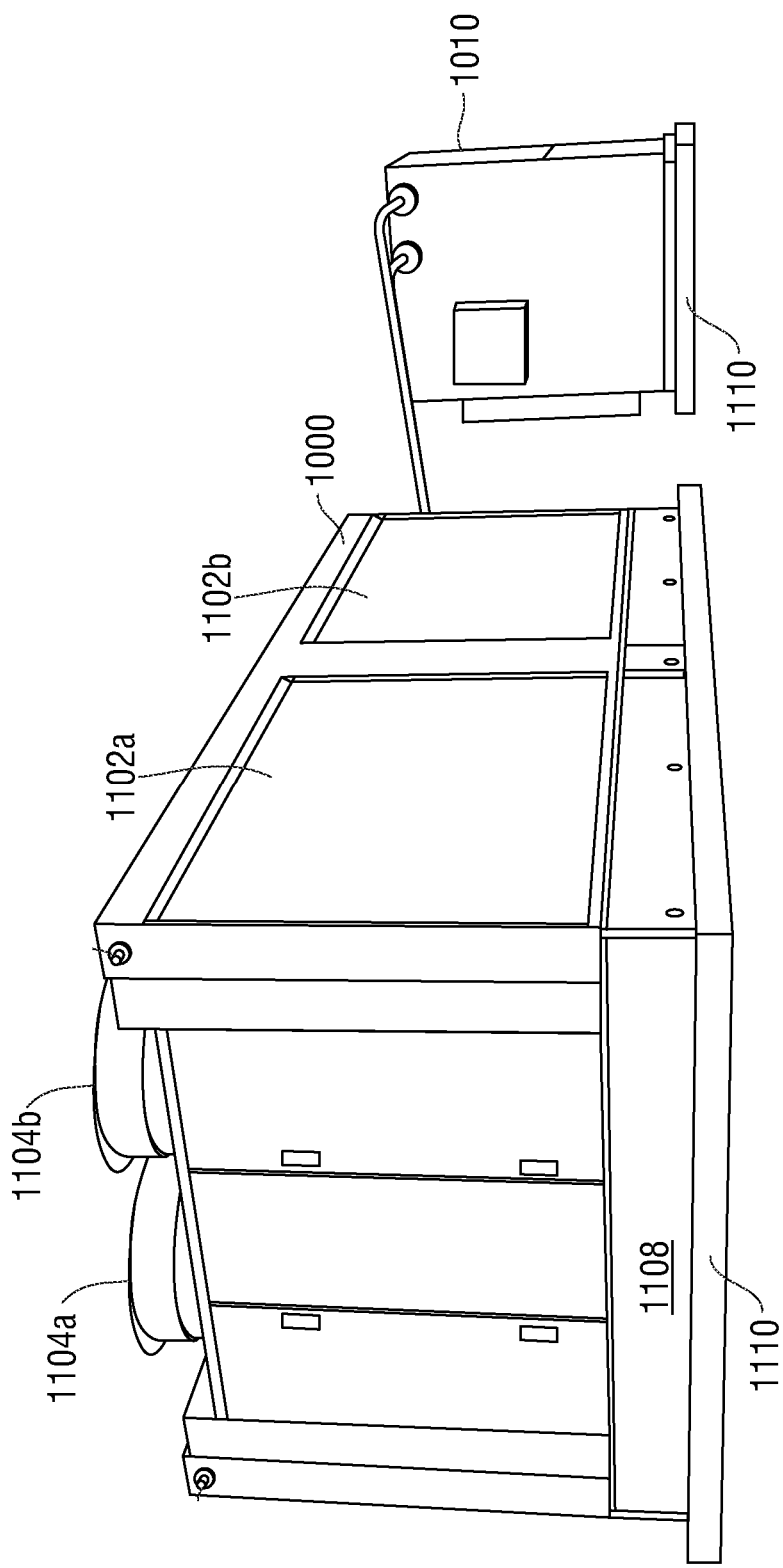
FIG. 11 is a perspective view of the fluid cooler and the chiller of the cooling system of FIG. 10.

FIG. 11 is a perspective view of the fluid cooler and the chiller of FIG. 10. As shown in FIG. 11, a chiller 1010 and a fluid cooler 1000 are each disposed in on a platform or concrete pad 1110. The chiller 1010 includes a skid 1108 that forms the foundation of the fluid cooler 1000. The fluid cooler 100 includes a plurality of fans 1104*a*, 1104*b*, and wet media 1102*a*, 1102*b* (e.g., and evaporative pad).

Figure 12:
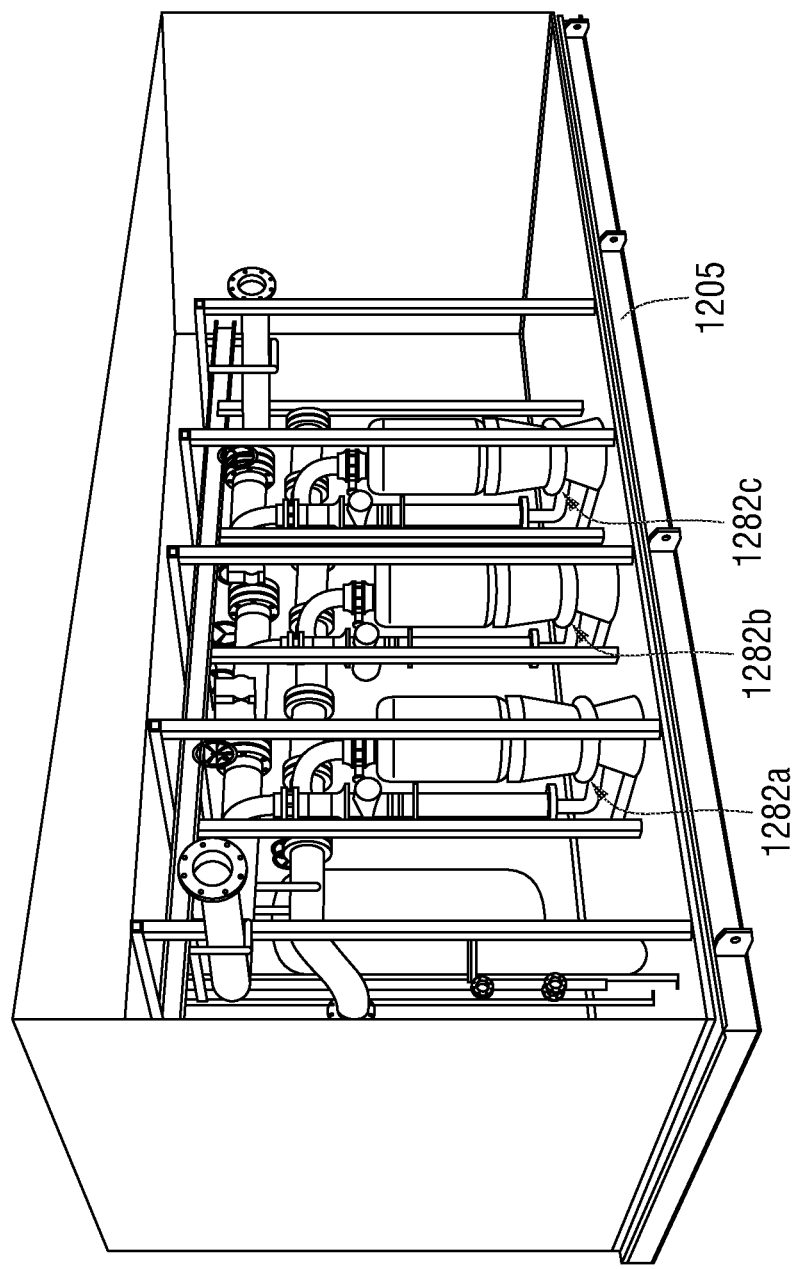
FIG. 12 is a perspective view of a pump house according to an embodiment of the present disclosure.

FIG. 12 is a perspective view of a pump house according to an embodiment of the present disclosure. Three fluid pumps 1282*a*-1282*c* are disposed on platform 1205.

Figure 13A:
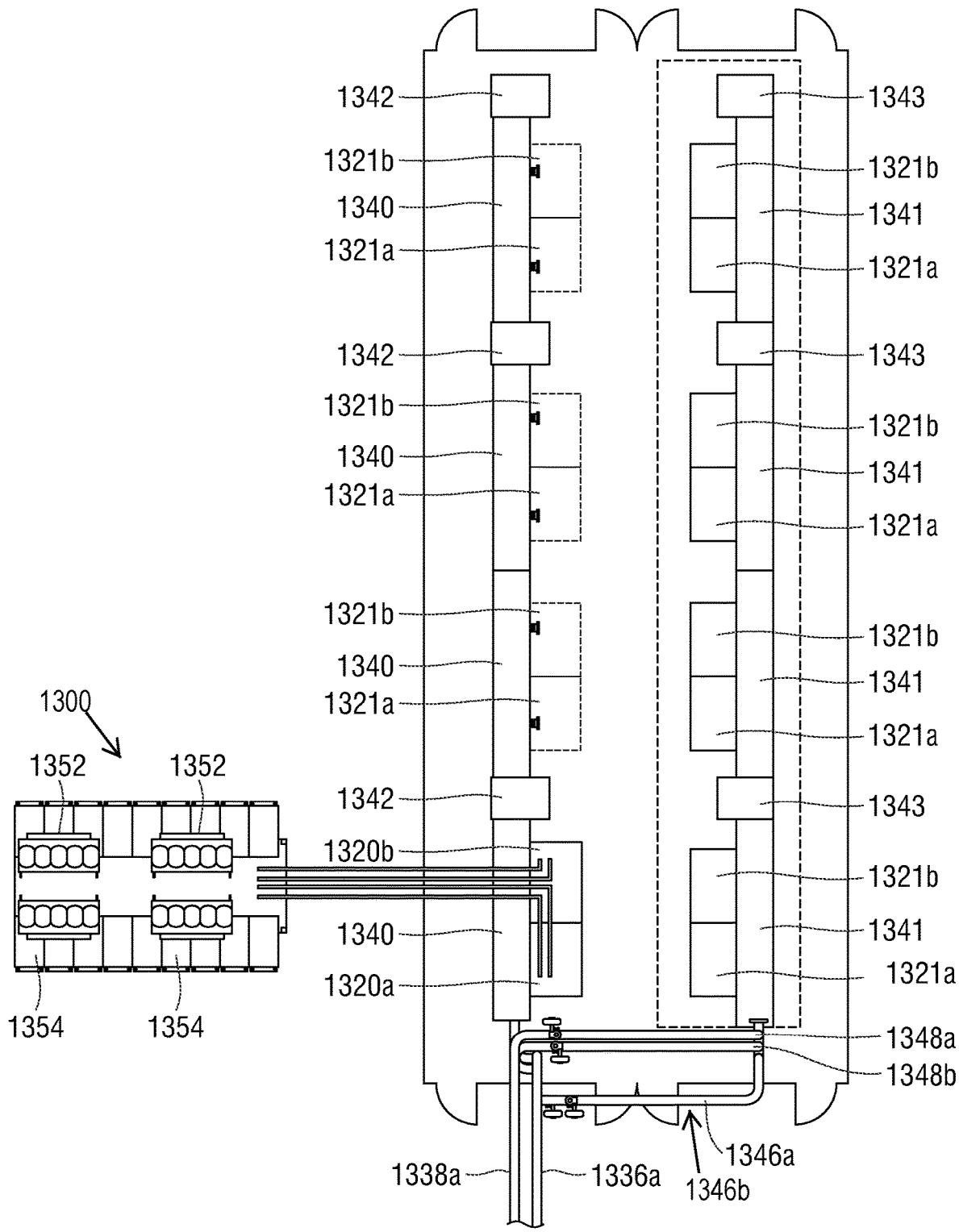
FIG. 13A is a top view of an indoor cooling assembly according to an embodiment of the present disclosure.

FIG. 13A is a top view of a fluid cooler assembly according to an embodiment of the present disclosure. The fluid cooler assembly includes multiple pipe cages 1340 that are joined together by bridge valve assemblies 1342. Cooling distribution units 1320*a*, 1320*b* are fluidly connected to a pipe cage module 1340, and a server rack assembly 1300, which includes evaporator cooling assemblies 1352 and server racks 1354, is fluidly connected to the cooling distribution units 1320*a*, 1320*b*. As further cooling distribution units are needed, they are connected at positions 1321*a*, 1321*b*. The first pipe cage 1340 is connected to supply lines 1336*a*, 1336*b* and return lines 1338*a*, 1338*b*. An additional row of pipe cages 1341 joined together by bridge valve assemblies 1343 may be connected to the supply and return lines 1336*a*, 1336*b*, 1338*a*, 1338*b* via supply and return line segments, e.g., 1346*a*, 1346*b* (which is a line segment beneath line segment 1346*a*), 1348*a*, 1348*b*, on a future date as cooling demands increase, e.g., as additional servers, server racks, or server rack assemblies are added to a data center.

Figure 13B:
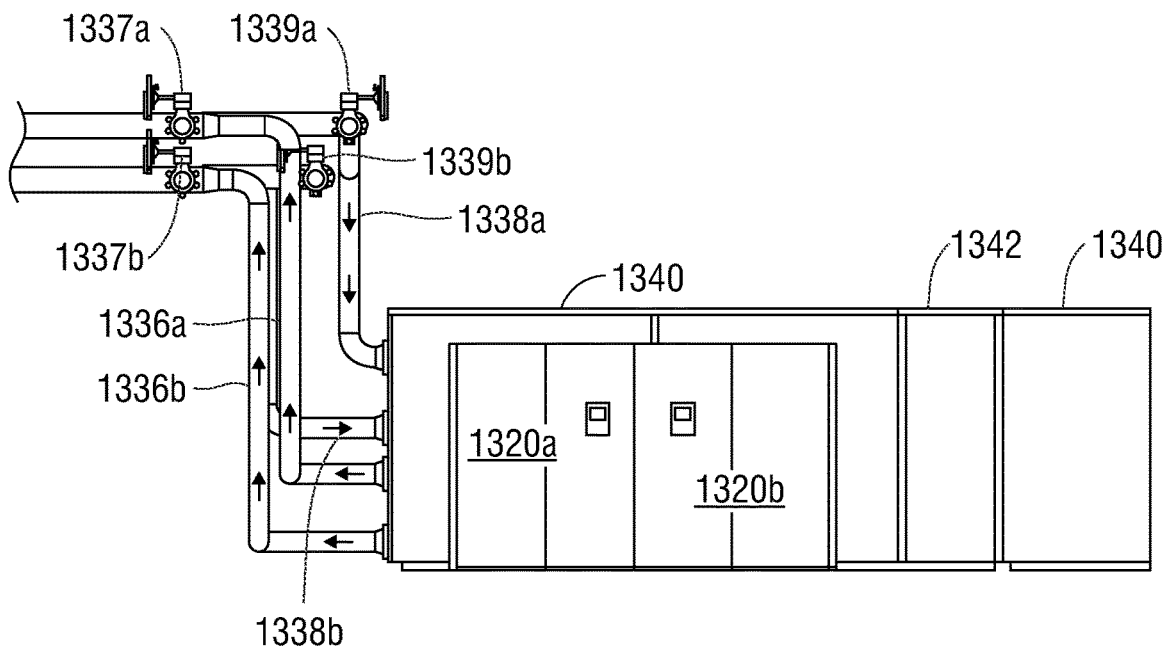
FIGS. 13B and 13C are elevation views of the indoor cooling assembly of FIG. 13A.
Figure 13C:
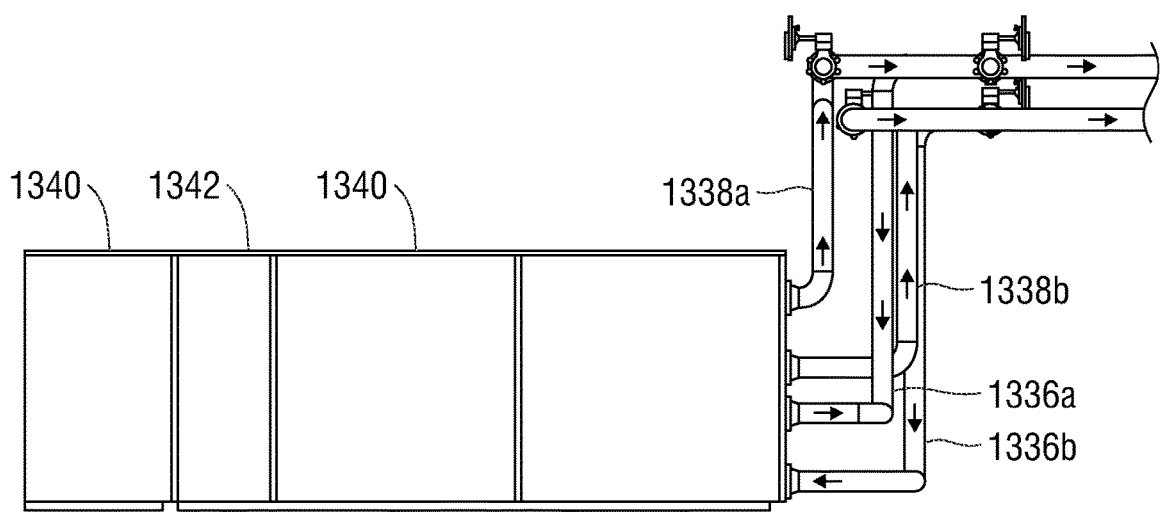

FIGS. 13B and 13C are elevation views of the fluid cooler assembly of FIG. 13A. FIG. 13B shows a first side of the fluid cooler assembly on which the CDUs 1320*a*, 1320*b* connect to the pipe cage 1340 and FIG. 13C shows the second side of the fluid cooler assembly on which the fluid cooler 1300 is disposed. The cooling water return pipes (not shown) in the pipe cage 1340 (not shown) connect to respective return lines or pipes 1338*a*, 1338*b*, which return cooling water from a heat source, such as server rack assemblies in a data center. The cooling water supply pipes (not shown) in the pipe cage 1340 connect to respective supply lines or pipes 1336*a*, 1336*b*, which supply cooling water to the heat source. The fluid cooler assembly also includes multiple isolation valves 1337*a*, 1337*b*, 1339*a*, 1339*b* coupled to respective pipes 1336*a*, 1336*b*, 1338*a*, 1338*b*.

Isolation valves 1337*a*, 1337*b*, 1339*a*, 1339*b* allow for the expansion of cooling capacity as additional servers are added to the data center. For example, as shown in FIG. 13A, another row of fluid coolers 1300 and CDUs 1320*a*, 1320*b* are added by coupling additional piping to isolation valves 1337*a*, 1337*b*, 1339*a*, 1339*b*, installing a series of additional pipe cages 1341 and bridge valve assemblies 1343, and coupling them to the other end of the additional piping. Then, additional CDUs 1321*a*, 1321*b* and fluid coolers (not shown) are installed and the additional CDUs 1321*a*, 1321*b* are fluidly coupled to the additional pipe cages 1341. Before another row of fluid coolers 1300 and CDUs 1320*a*, 1320*b* are added, isolation valves 1337*a*, 1337*b*, 1339*a*, 1339*b* are closed. Once the additional piping, the additional pipe cages 1341, the additional bridge valve assemblies 1343, the additional CDUs 1321*a*, 1321*b*, and the additional fluid coolers (not shown) are installed, isolation valves 1337*a*, 1337*b*, 1339*a*, 1339*b* are opened to allow cooling water to flow between the heat source and the additional CDUs 1321*a*, 1321*b* via the additional pipe cages 1341. Using this modular approach, the cooling capabilities of the cooling system may be progressively expanded to keep pace with expansions, for example, to a data center.

Figure 14:
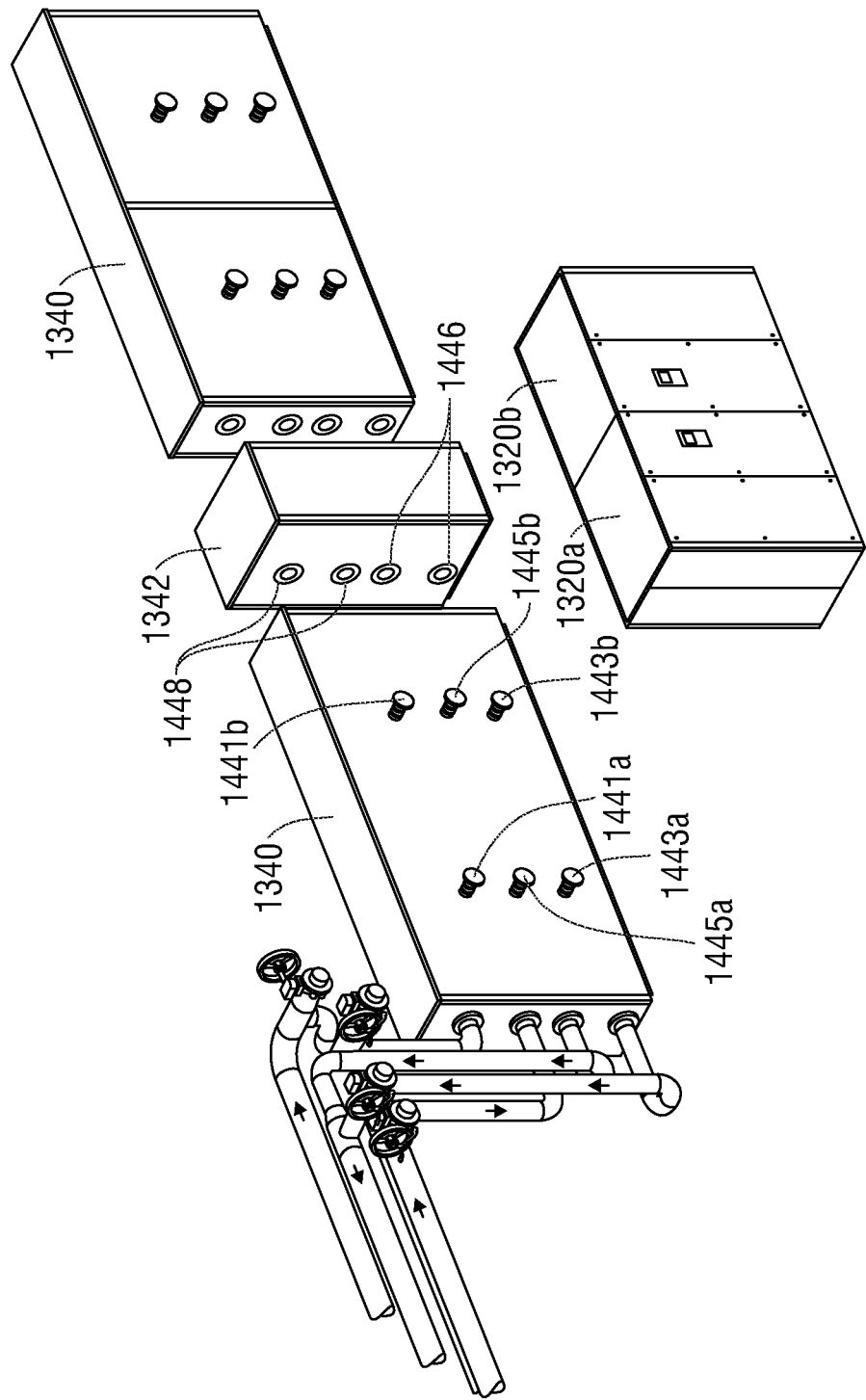
FIG. 14 is an exploded view of an indoor cooling assembly according to an embodiment of the present disclosure.
Figure 15A:
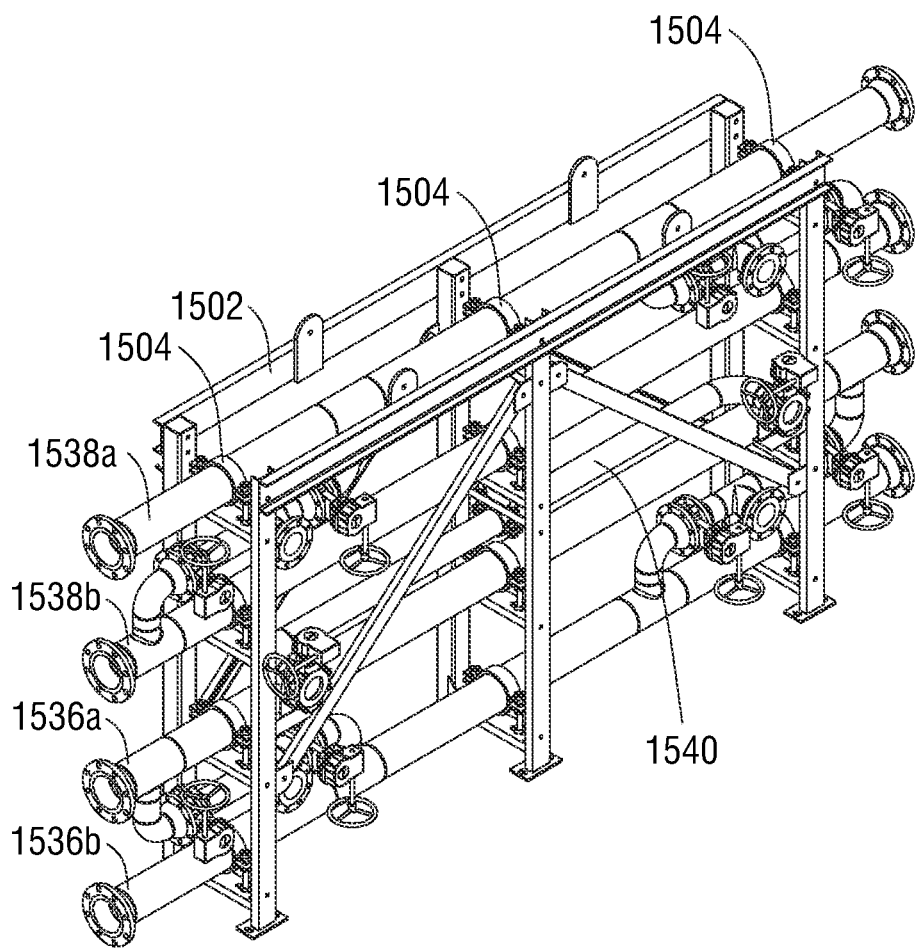
FIG. 15A is a perspective view of a pipe cage module according to an embodiment of the present disclosure.
Figure 15B:
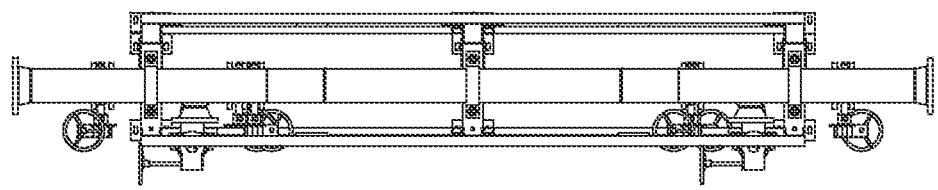
FIG. 15B is a top view of the pipe cage module of FIG. 15A.

FIG. 14 is an exploded view of a fluid cooler assembly according to an embodiment of the present disclosure. Each of the pipe cages 1340 include cooling water return flange connectors 1441*a*, 1441*b*, which are in fluid communication with the cooling water return piping and cooling water supply flange connectors 1443*a*, 1443*b* in fluid communication with the cooling water supply piping. The flange connectors 1441*a*, 1441*b*, 1443*a*, 1443*b* connect to respective connectors in the CDUs 1320*a*, 1320*b*. Flange connectors 1445*a*, 1445*b* are in fluid communication with each other, e.g., via pipe section 1540 shown in FIG. 15A, and provide a series connection between CDU section 1320a and CDU section 1320b.

Opposite sides of each of the bridge valve assemblies 1342 include cooling water return flange connectors 1448 which are in fluid communication with isolation valves (not shown) within the bridge valve assemblies 1342 and cooling water supply flange connectors 1446 in fluid communication with isolation valves (not shown) within the bridge valve assemblies 1342. The flange connectors 1446, 1448 connect to respective flange connectors on opposite sides of the pipe cages 1340. The isolation valves (not shown) within the bridge valve assemblies 1342 may be closed until another pipe cage 1340 is connected on the other side of the bridge valve assemblies 1342.

Figure 15C:
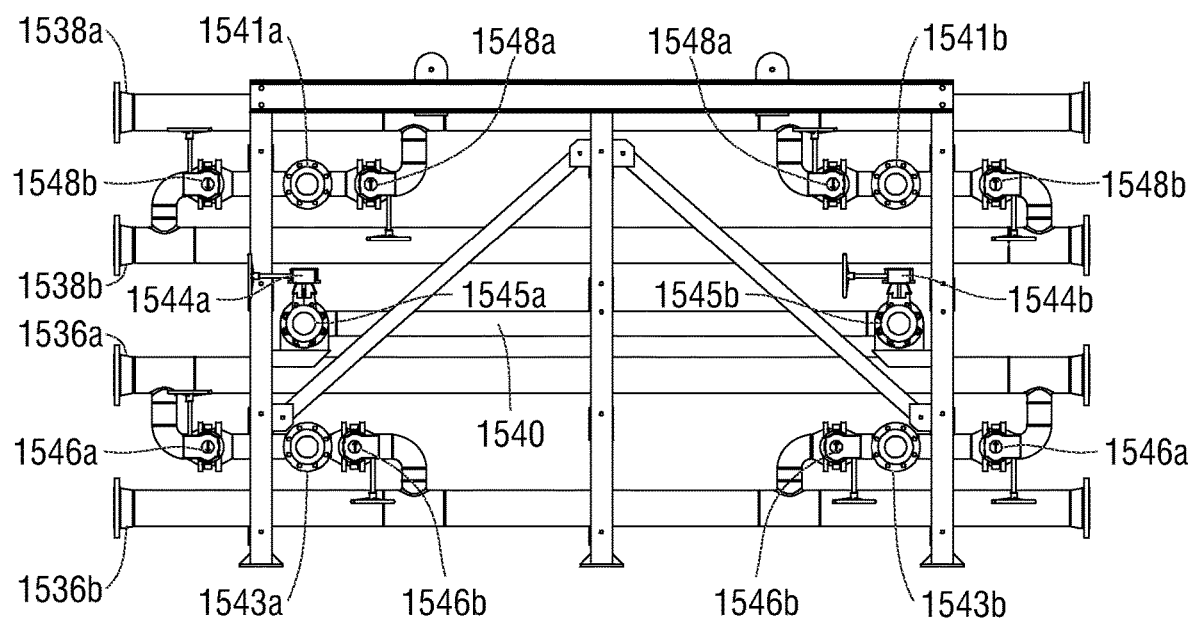
FIG. 15C is a front view of the pipe cage module of FIG. 15A.
Figure 15D:
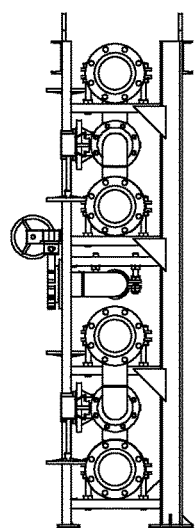
FIG. 15D is an elevation view of the pipe cage module of FIG. 15A.

FIGS. 15A-15D show a pipe cage assembly according to an embodiment of the present disclosure. The pipe cage includes a frame 1502 having multiple cross beams on which multiple respective pipes 1536a, 1536b, 1538a, 1538b are disposed. The pipes 1536a, 1536b, 1538a, 1538b are attached to the frame 1502 via clamps 1504. As shown in FIG. 15C, pipes 1536a, 1536b are in fluid communication with a first flange connector 1543a for connecting to a first CDU section, e.g., CDU section 1320a of FIG. 14, and a second flange connector 1543b for connecting to a second CDU section, e.g., CDU section 1320b of FIG. 14. Pipes 1536a, 1536b are in fluid communication with the first flange connector 1543a and the second flange connector 1543b via respective valves 1546a, 1546b.

Similarly, pipes 1538a, 1538b are in fluid communication with a third flange connector 1541a for connecting to the first CDU section and a fourth flange connector 1541b for connecting to the second CDU section. Pipes 1538a, 1538b are in fluid communication with the third flange connector 1541a and the fourth flange connector 1541b via respective valves 1548a, 1548b.

The pipe cage assembly also includes pipe section 1540 in fluid communication with a fifth flange connector 1545a for connecting to the first CDU section and a sixth flange connector 1545b for connecting to the second CDU section. Pipe 1540 is in fluid communication with the fifth flange connector 1545a and the sixth flange connector 1545b via respective valves 1544a, 1544b. When flange connectors 1545a, 1545b are connected to respective flange connectors on the CDU sections, pipe section 1540 provides a series connection between CDU sections. Pipe section 1540 is an illustrative embodiment on the series connection line 148 shown in FIG. 1C, which connects the "A" circuit 120a (which may correspond to the second CDU section) in series with the "B" circuit 120b (which may correspond to the first CDU section). Valves 1544a, 1544b, 1546a, 1546b, 1548a, 1548b may be closed during installation of the CDU sections, but may be opened once installation of the CDU sections is complete.

Figure 16A:
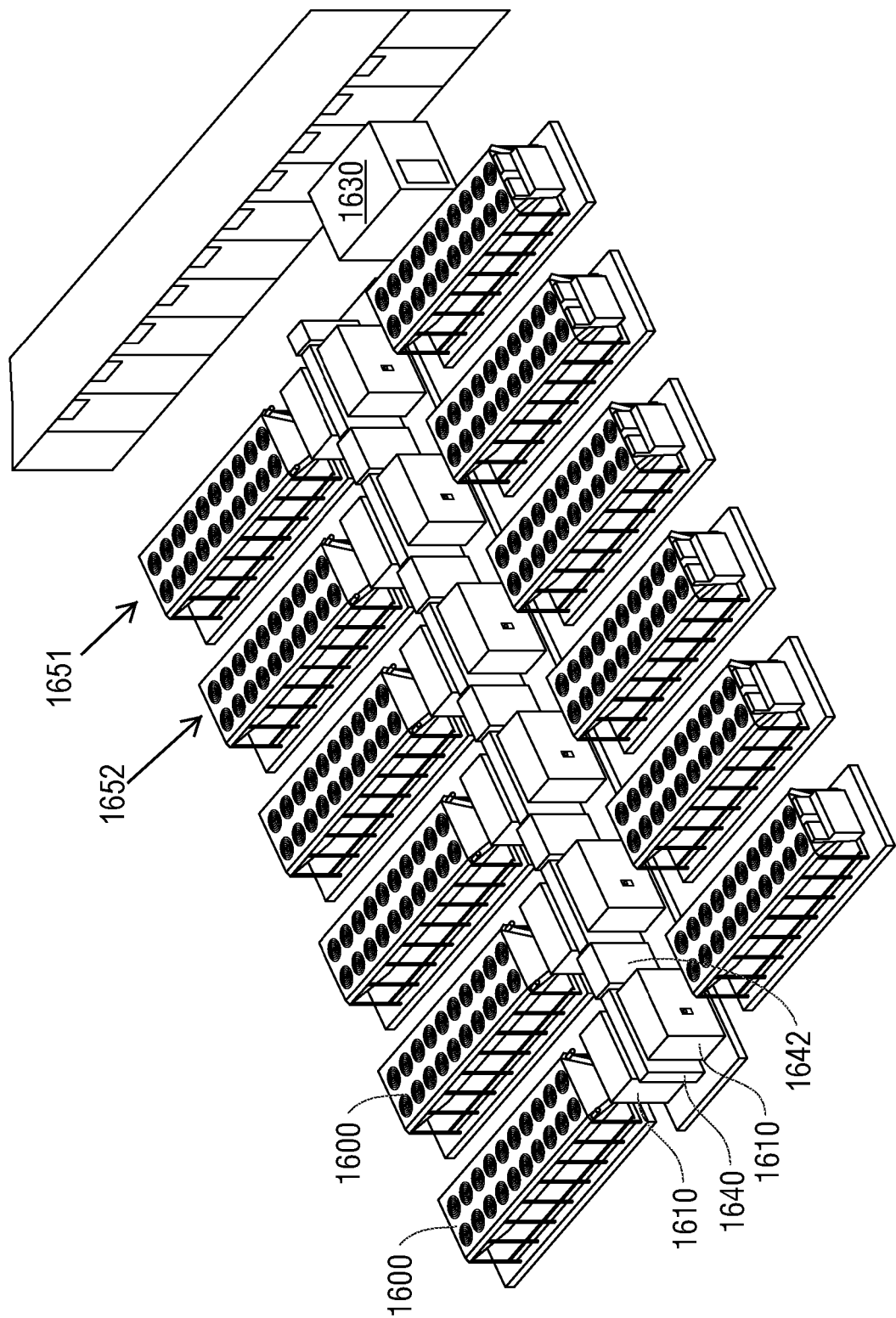
FIG. 16A is a perspective view of an outdoor cooling assembly according to another embodiment of the present disclosure.

FIG. 16A is a perspective view of an outdoor portion of a cooling system according to an embodiment of the present disclosure, which may be connected an indoor portion of the cooling system, which is illustrated by the cooling equipment of FIG. 13A. The outdoor portion of the cooling system includes multiple fluid coolers 1600, multiple chillers 1610, which are fluidly connected to respective fluid coolers 1600, pipe cages 1640 which are fluidly connected to pairs of chillers 1610, bridge valve assemblies 1642 that fluidly connect the pipe cages 1640 to each other, and a pump house 1630 connected to a bridge valve assembly 1642 via supply lines 1636a, 1636b. The bridge valve assembly 1642 is also fluidly connected to return lines 1638a, 1638b. In embodiments, a first row 1651 of fluid coolers 1600, chillers 1610, pipe cages 1640, and bridge valve assemblies 1642 may be installed first and then a second row 1652 of fluid coolers 1600, chillers 1610, pipe cages 1640, and bridge valve assemblies 1642 may be installed later when greater cooling capacity is needed.

Figure 16B:
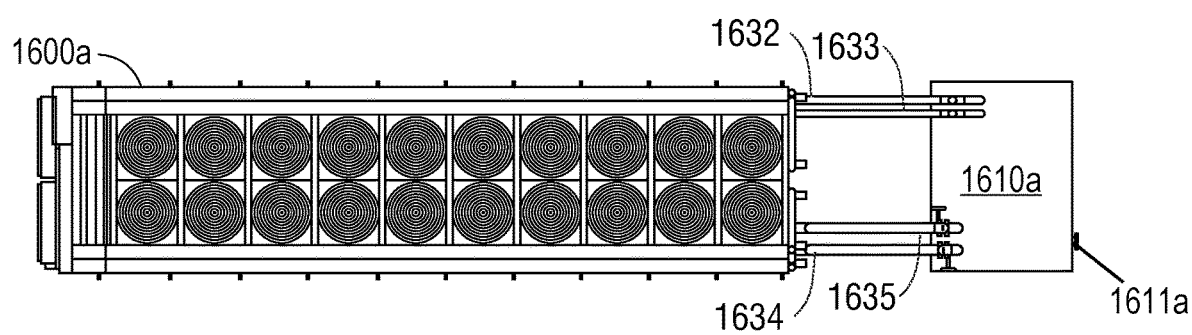
FIGS. 16B and 16C are top views of a portion of the outdoor cooling assembly of FIG. 16A.
Figure 16C:
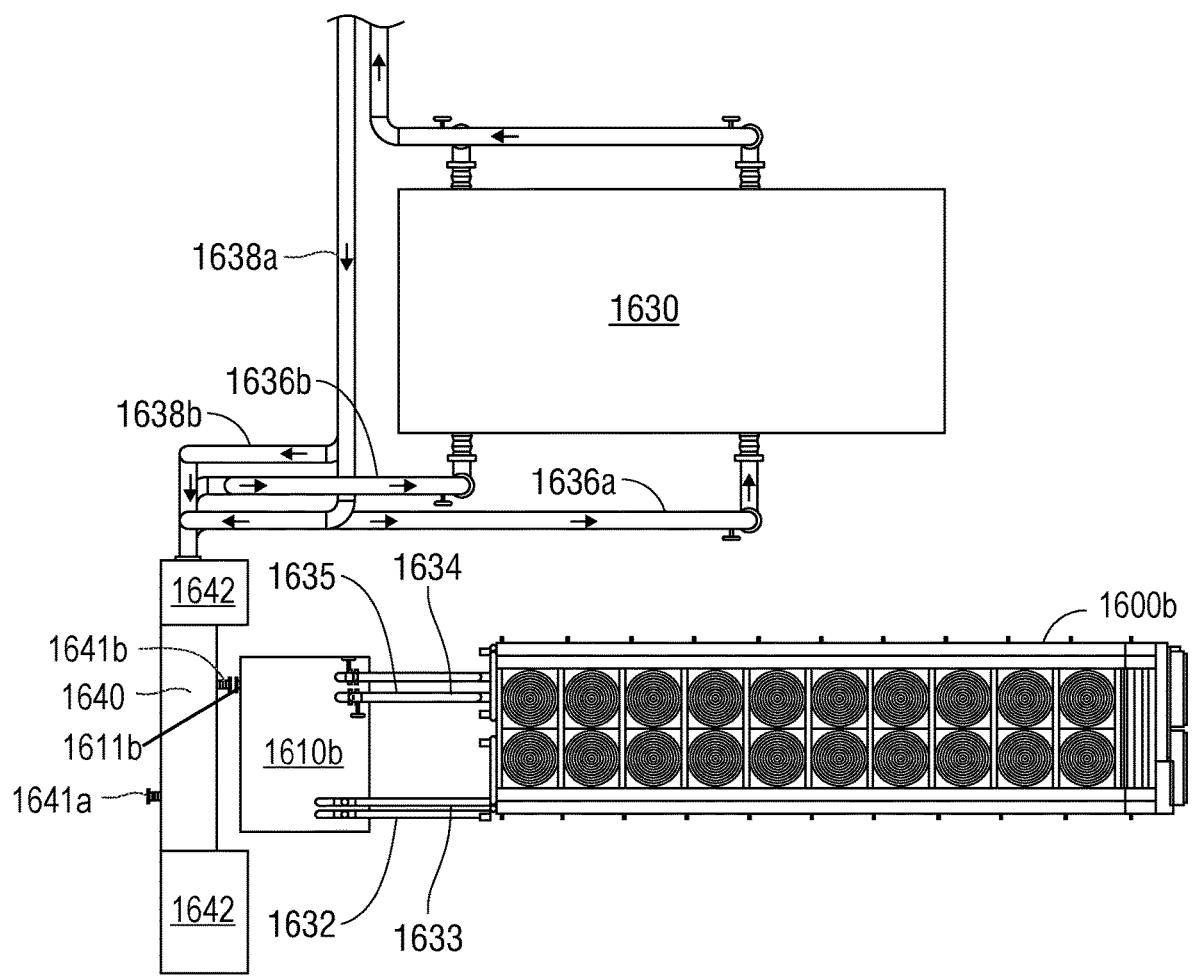

FIGS. 16B and 16C are top views of a portion of the outdoor cooling system of FIG. 16A. FIG. 16B shows a fluid cooler 1600a of a first row 1651 fluidly coupled to a chiller 1610a. The fluid cooler 1600a connects to the chiller 1610a through a refrigerant supply line 1632, a refrigerant return line 1633, a cooling water supply line 1634, and a cooling water return line 1635. The chiller 1610a includes a flange connector 1611a that connects to a flange connector 1641a of the pipe cage module 1640 shown in FIG. 16C.

FIG. 16C shows another fluid cooler 1600b of the first row 1651 fluidly connected to another chiller 1610b. The another fluid cooler 1600b is connected to another chiller 1610b through another refrigerant supply line 1632, another refrigerant return line 1633, another cooling water supply line 1634, and another cooling water return line 1635. The another chiller 1610b includes a flange connector 1611b that connects to a flange connector 1641b of the pipe cage 1640.

As illustrated in FIGS. 16B and 16C, the cooling system may be expanded by first connecting two fluid coolers 1600 and two respective chillers 1610 to pipe cage 1640 and connecting a bridge valve assembly 1642 to the end of the pipe cage 1640. Then, if additional fluid coolers 1600 are needed, e.g., in the case where additional server racks are installed in a data center, another pipe cage 1640 and another bridge valve assembly 1642 are added so that one or two additional fluid coolers 1600 and chillers 1610 may be installed to meet the increased heat load of the additional server racks.

Figure 16D:
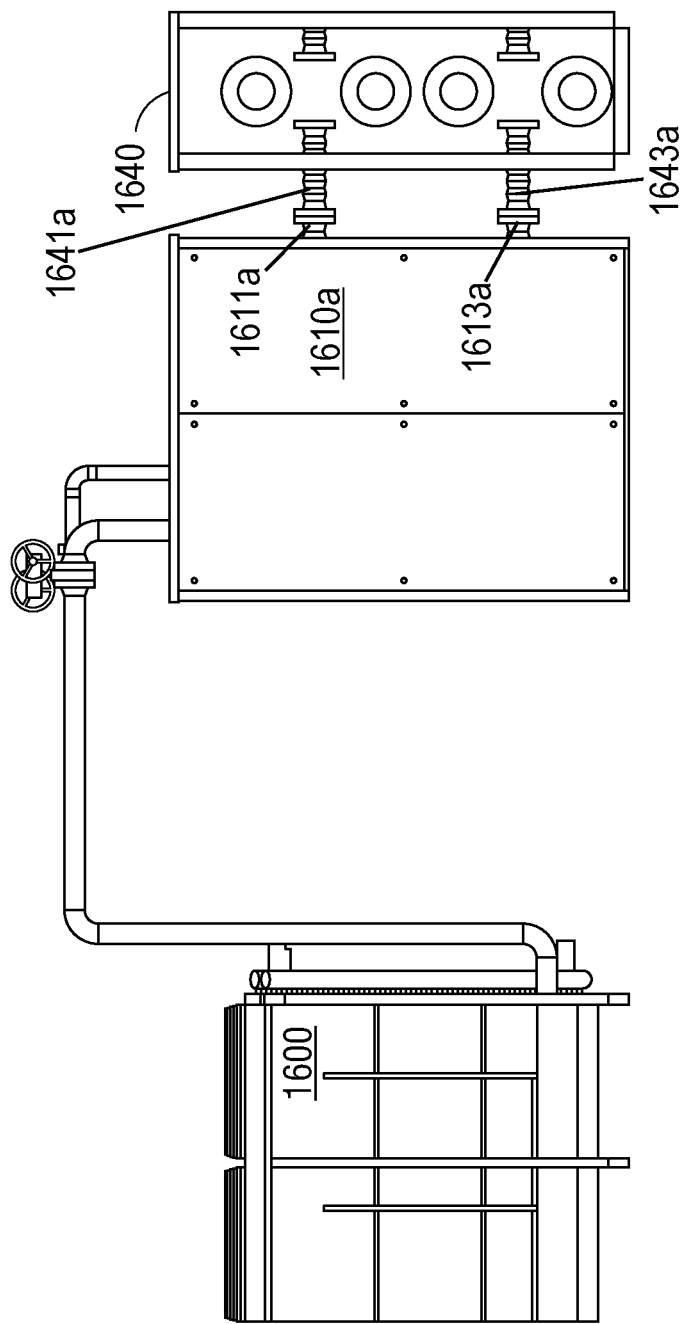
FIG. 16D is an elevation view of the portion of the outdoor cooling assembly of FIG. 16A.
Figure 16E:
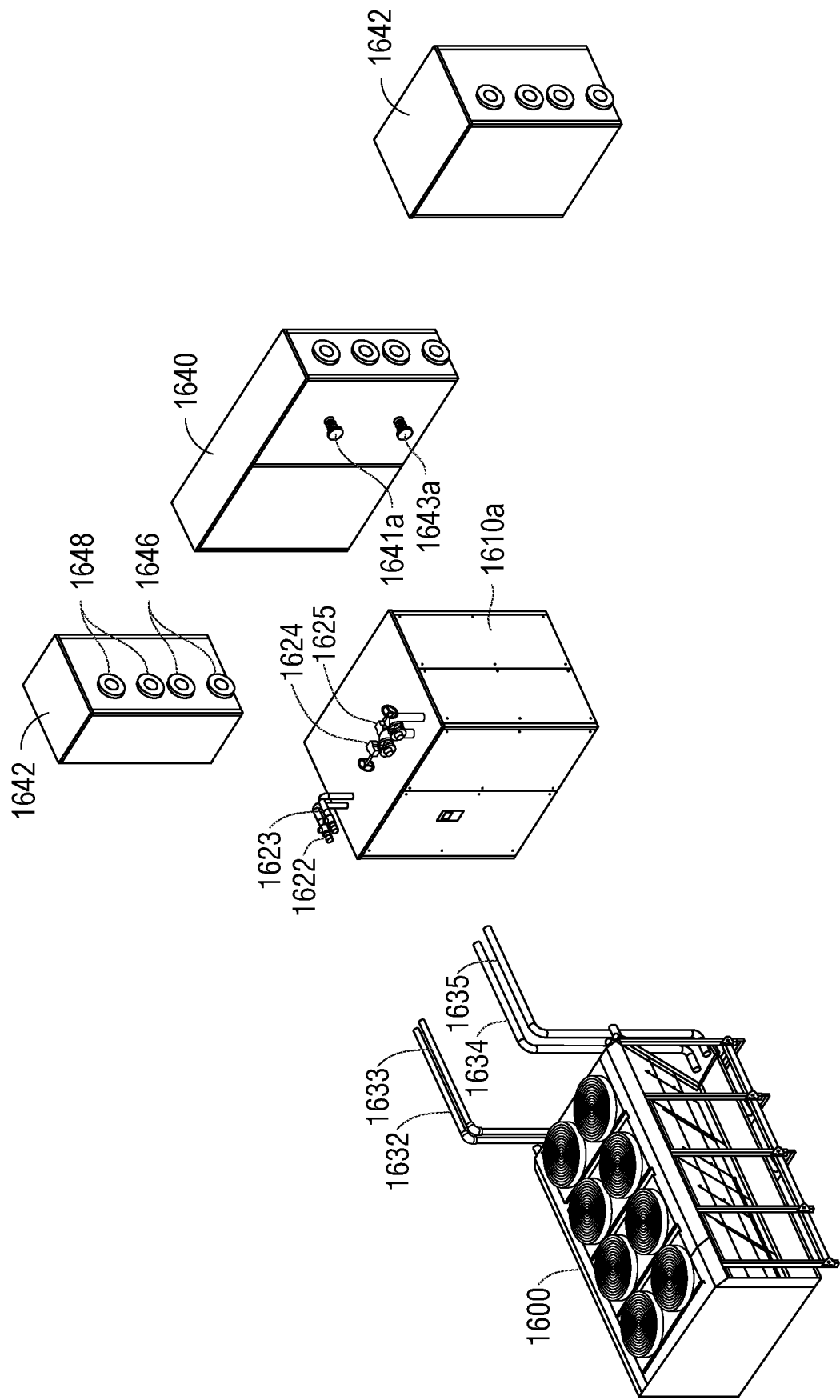
FIG. 16E is an exploded view of the portion of the outdoor cooling assembly of FIG. 16A.

As shown in FIGS. 16D and 16E, the pipe cage 1640 includes flange connectors 1641a, 1643a, which connect to corresponding flange connectors 1611a, 1613a, of the chiller 1610a. The pipe cage 1640 also includes flange connectors, e.g., a flange connector 1641b and another flange connector (not shown) disposed below the flange connector 1641b, on the opposite side of the pipe cage 1640 so that chiller 1610b can be connected to the pipe cage 1640 via flange connector 1611b and another flange connector (not shown) disposed below the flange connector 1611b. The bridge valve assembly 1642 includes cooling water supply flange connectors 1646 and cooling water return flange connectors 1648, which connect to corresponding flange connectors (not shown) in the pipe cage 1640. Bridge valve assembly 1642 is connected on the opposite side of the pipe cage 1640 to enable future expansion of the cooling system. The chiller 1610 includes isolation valves 1622-1625, which can be closed so that maintenance can be performed on the fluid cooler 1600 or the connecting piping 1632-1635, or so that the fluid cooler 1600 can be replaced.

The term "fluid cooler/chiller unit" may refer to an integrated structure or unit that includes both a fluid cooler and a chiller or a configuration where the fluid cooler and the chiller are separate structures or units, such as modular structures, but operate together as a system. In embodiments, the configuration where the fluid cooler and the chiller are separate structures allows for easy replacement of a fluid cooler or a chiller in case the fluid cooler or the chiller fails to operate.

Although the present invention has been fully described in connection with embodiments of the present invention with reference to the accompanying drawings, it is to be noted that various changes and modifications will become appar-

What is claimed is:

1. A cooling method comprising:
sensing a first temperature at a first location in a fluid circuit;
determining whether the first temperature is greater than a first predetermined temperature;
if the first temperature is not greater than the first predetermined temperature, cooling a fluid using ambient air;
if the first temperature is greater than the first predetermined temperature, cooling the fluid using the ambient air and a refrigeration circuit;
sensing a dry bulb temperature of the ambient air;
sensing a second temperature at a second location in the fluid circuit;
determining whether the dry bulb temperature is greater than the second temperature;
if the dry bulb temperature is greater than the second temperature, cooling fluid flowing through the fluid circuit using the refrigeration circuit;
determining whether a fan power is greater than a predetermined power;
if the fan power is not greater than the predetermined power, cooling the fluid flowing through the fluid circuit using the ambient air; and
if the fan power is greater than the first predetermined temperature, cooling the fluid using the ambient air and the refrigeration circuit.

2. A cooling method comprising:
sensing a first temperature at a first location in a fluid circuit;
determining whether the first temperature is greater than a first predetermined temperature;
if the first temperature is not greater than the first predetermined temperature, cooling a fluid using ambient air;
if the first temperature is greater than the first predetermined temperature, cooling the fluid using the ambient air and a refrigeration circuit;
sensing a dry bulb temperature of the ambient air;
sensing a second temperature at a second location in the fluid circuit;
determining whether the dry bulb temperature is greater than the second temperature;
if the dry bulb temperature is greater than the second temperature, cooling fluid flowing through the fluid circuit using the refrigeration circuit;
sensing a wet bulb temperature of the ambient air;
determining whether the wet bulb temperature is less than a predetermined wet bulb temperature;
if the wet bulb temperature is less than a predetermined wet bulb temperature, cooling the fluid flowing through the fluid circuit using the ambient air; and
if the wet bulb temperature is not less than a predetermined wet bulb temperature, cooling the fluid using the ambient air and the refrigeration circuit.

3. The cooling method of claim 1, further comprising:
sensing the second temperature at the second location in the fluid circuit;
determining whether the dry bulb temperature is less than the second temperature minus a predetermined number of degrees;
if the dry bulb temperature is not less than the second temperature, cooling the fluid flowing through the fluid circuit using the refrigeration circuit; and
if the dry bulb temperature is less than the second temperature, cooling the fluid flowing through the fluid circuit using the ambient air and the refrigeration circuit.

4. A cooling method comprising:
sensing a dry bulb temperature and a wet bulb temperature of ambient air;
operating a fluid cooler and a chiller according to one of the following modes based on the dry bulb temperature and wet bulb temperature of the ambient air:
a free cooling dry operational mode in which a fluid circuit of the fluid cooler is cooled by ambient air, if the wet bulb temperature is less than a predetermined wet bulb temperature;
a free cooling wet operational mode in which the fluid circuit of the fluid cooler is cooled by ambient air that has been cooled by wet media, if the wet bulb temperature is less than a predetermined wet bulb temperature and the dry bulb temperature is greater than a predetermined dry bulb temperature;
a partial free cooling dry operational mode in which the fluid circuit is cooled by ambient air and by a refrigerant circuit, if a fluid circuit temperature is greater than a fluid circuit temperature setpoint;
a partial free cooling wet operational mode in which the fluid circuit is cooled by a refrigerant circuit and by ambient air that has been cooled by wet media, if a fluid circuit temperature is greater than a fluid circuit temperature setpoint and the dry bulb temperature is greater than the predetermined dry bulb temperature;
a mechanical cooling dry operational mode in which the fluid circuit is cooled by the refrigerant circuit, if the dry bulb temperature is greater than a fluid circuit temperature; and
a mechanical cooling wet operational mode in which the fluid circuit is cooled by the refrigerant circuit and a heat exchanger of the refrigerant circuit is in thermal communication with ambient air that has been cooled by wet media, if the dry bulb temperature is greater than the fluid circuit temperature and the dry bulb temperature is greater than the predetermined dry bulb temperature.

* * * * *